United States Patent
Fujishiro et al.

(10) Patent No.: US 9,705,578 B2
(45) Date of Patent: Jul. 11, 2017

(54) MOBILE COMMUNICATION SYSTEM, USER TERMINAL, AND PROCESSOR

(71) Applicant: KYOCERA CORPORATION, Kyoto (JP)

(72) Inventors: Masato Fujishiro, Yokohama (JP); Chiharu Yamazaki, Ota-ku (JP)

(73) Assignee: KYOCERA Corporation, Kyoto (JP)

(*) Notice: Subject to any disclaimer, the term of this patent is extended or adjusted under 35 U.S.C. 154(b) by 73 days.

(21) Appl. No.: 14/440,586

(22) PCT Filed: Nov. 5, 2013

(86) PCT No.: PCT/JP2013/079925
§ 371 (c)(1),
(2) Date: May 4, 2015

(87) PCT Pub. No.: WO2014/073538
PCT Pub. Date: May 15, 2014

(65) Prior Publication Data
US 2015/0304003 A1    Oct. 22, 2015

Related U.S. Application Data

(60) Provisional application No. 61/723,052, filed on Nov. 6, 2012.

(51) Int. Cl.
*H04B 7/04* (2017.01)
*H04W 76/02* (2009.01)
(Continued)

(52) U.S. Cl.
CPC .......... *H04B 7/0478* (2013.01); *H04B 7/024* (2013.01); *H04B 7/0452* (2013.01);
(Continued)

(58) Field of Classification Search
None
See application file for complete search history.

(56) References Cited

U.S. PATENT DOCUMENTS

| | | | |
|---|---|---|---|
| 8,565,334 B2 | 10/2013 | Ito | |
| 9,048,970 B1 * | 6/2015 | Gomadam | .......... H04J 11/0033 |

(Continued)

FOREIGN PATENT DOCUMENTS

| | | |
|---|---|---|
| JP | 2011-014979 A | 1/2011 |
| WO | 2010/109518 A1 | 9/2010 |
| WO | 2011/085200 A1 | 7/2011 |

OTHER PUBLICATIONS

International Search Report; PCT/JP2013/079925; Feb. 4, 2014.
(Continued)

*Primary Examiner* — Faruk Hamza
*Assistant Examiner* — Cassandra Decker
(74) *Attorney, Agent, or Firm* — Studebaker & Brackett PC

(57) ABSTRACT

A mobile communication system performs multi-antenna transmission by applying a precoder matrix for determining transmission directionality. The mobile communication system comprises a user terminal that starts feedback of predetermined precoder matrix information to a node in response to an instruction from the node controlling communication. The predetermined precoder matrix information is used to decide the precoder matrix that is applied to transmission to another user terminal different from the user terminal. The user terminal comprises: a control unit that switches whether to stop the feedback after starting the feedback in response to the instruction.

5 Claims, 22 Drawing Sheets

(51) Int. Cl.
*H04B 7/02* (2017.01)
*H04B 7/06* (2006.01)
*H04W 16/28* (2009.01)
*H04B 7/024* (2017.01)
*H04B 7/0452* (2017.01)

(52) U.S. Cl.
CPC ........ *H04B 7/0639* (2013.01); *H04W 76/023* (2013.01); *H04W 16/28* (2013.01)

(56) References Cited

U.S. PATENT DOCUMENTS

| | | | | |
|---|---|---|---|---|
| 2009/0247214 A1* | 10/2009 | Cai | ................ | H04W 52/0216 455/550.1 |
| 2010/0254474 A1* | 10/2010 | Gomadam | ........... | H04B 7/0417 375/267 |
| 2010/0311430 A1 | 12/2010 | Katayama et al. | | |
| 2010/0322176 A1 | 12/2010 | Chen et al. | | |
| 2012/0008699 A1 | 1/2012 | Ito | | |
| 2013/0058425 A1* | 3/2013 | Zhou | ................ | H04B 7/0469 375/267 |
| 2013/0142174 A1* | 6/2013 | Larsson | ............ | H04B 7/0434 370/335 |
| 2013/0343216 A1* | 12/2013 | Su | ................. | H04W 24/10 370/252 |
| 2014/0185529 A1* | 7/2014 | Lim | ................ | H04W 76/023 370/328 |
| 2015/0103789 A1* | 4/2015 | Tanaka | ............... | H04W 76/023 370/329 |

OTHER PUBLICATIONS

Written Opinion of the International Searching Authority; PCT/JP2013/079925; Feb. 4, 2014.
3GPP TS 36.300 V11.0.0 (Dec. 2011); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11); pp. 1-194.
3GPP TSG RAN WG1 #55bis Meeting; "UE PMI feedback signalling for user pairing/coordination"; Alcatel-Lucent; Ljubljana, Slovenia; Jan. 12-16, 2009; R1-090051; pp. 1-3.
The extended European search report issued by the European Patent Office on Sep. 2, 2016, which corresponds to European Patent Application No. 13852973.0-1874 and is related to U.S. Appl. No. 14/440,586.

* cited by examiner

FIG. 14

CODEBOOK FOR 2ANT

| PMI \ ANTENNA | ANT#1 | ANT#2 |
|---|---|---|
| 1 | W11 | W12 |
| 2 | W21 | W22 |
| 3 | W31 | W32 |
| n | Wn1 | Wn2 |

CODEBOOK FOR 4ANT

| PMI \ ANTENNA | ANT#1 | ANT#2 | ANT#3 | ANT#4 |
|---|---|---|---|---|
| 1 | W11 | W12 | W13 | W14 |
| 2 | W21 | W22 | W23 | W24 |
| 3 | W31 | W32 | W33 | W34 |
| n | Wn1 | Wn2 | Wn3 | Wn4 |

:

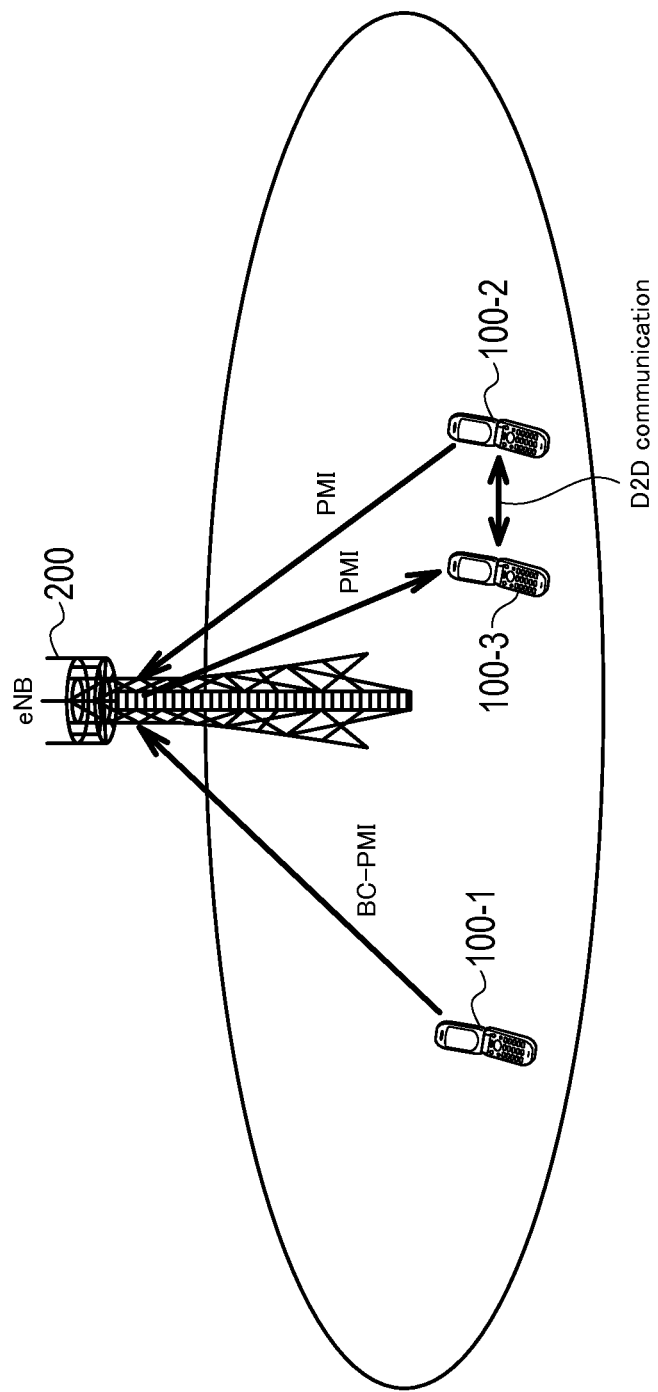

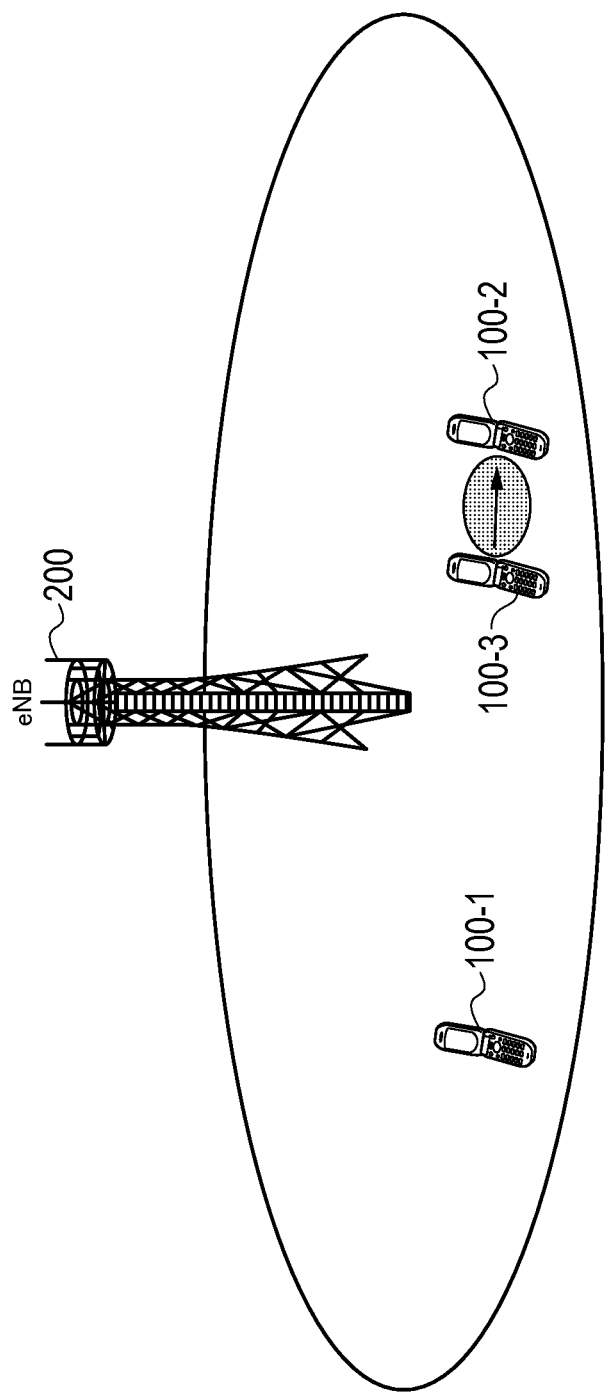

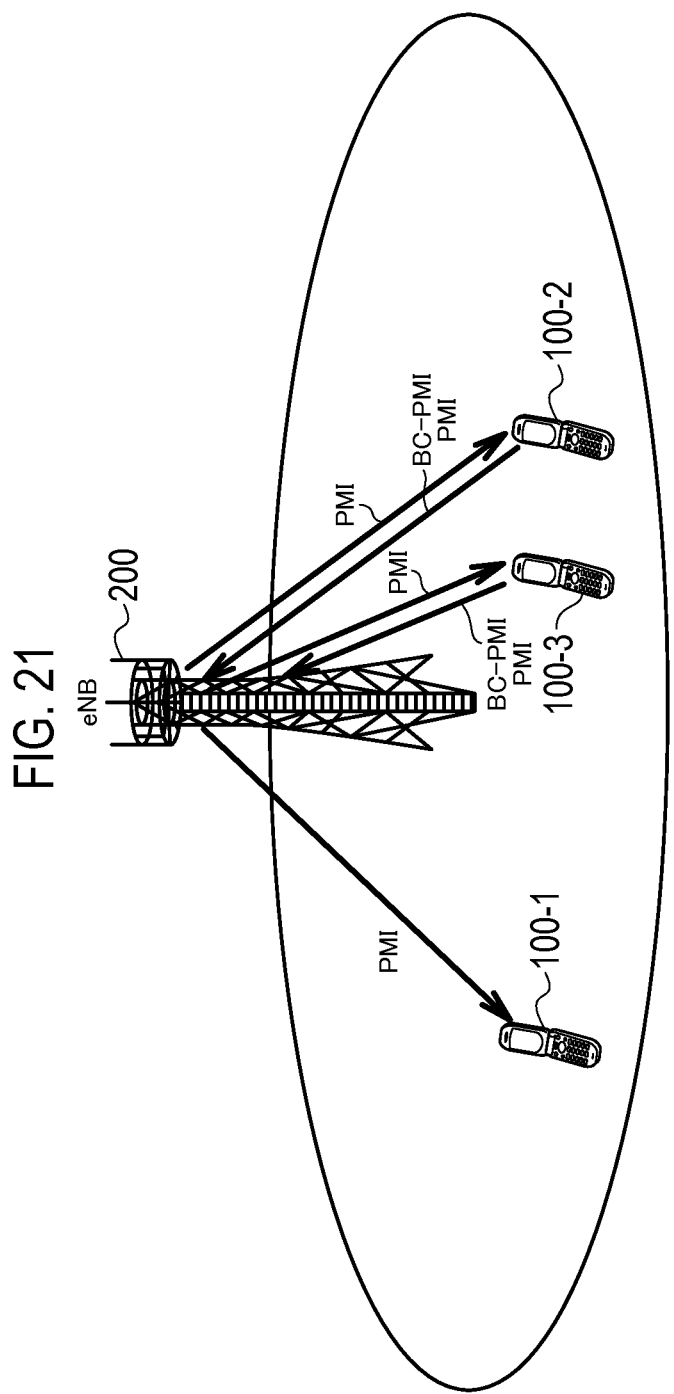

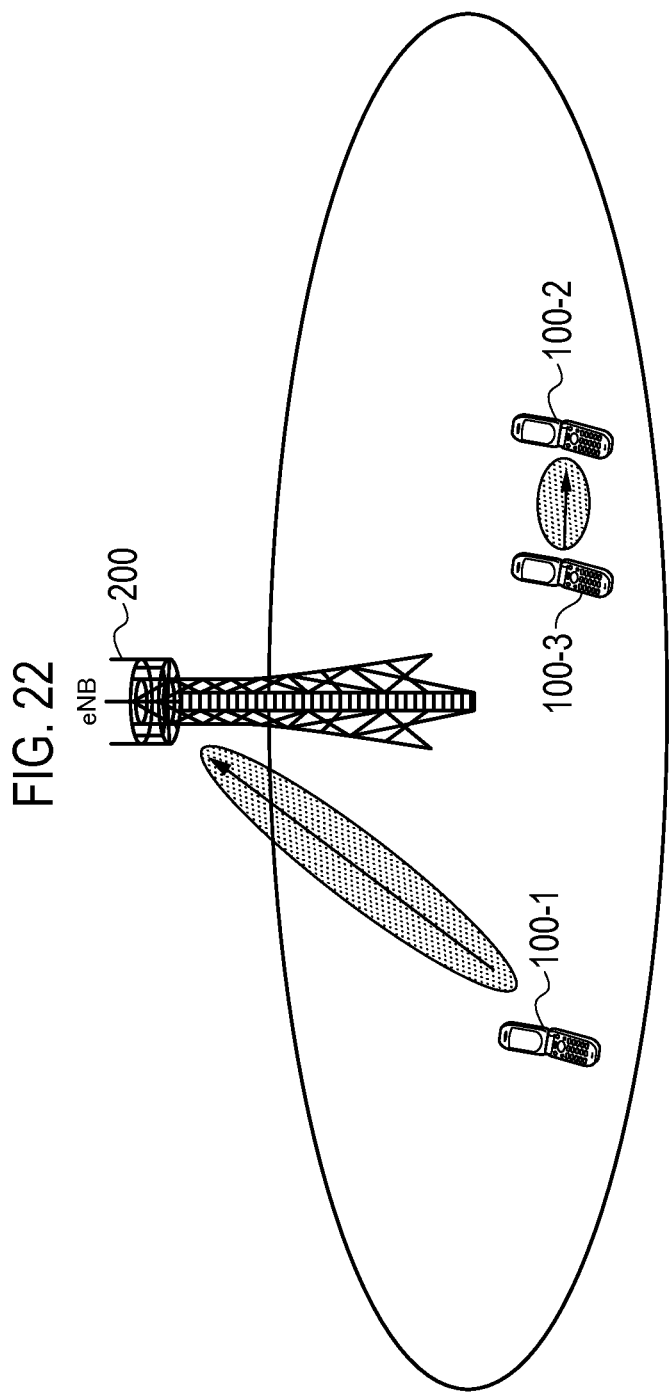

MOBILE COMMUNICATION SYSTEM, USER TERMINAL, AND PROCESSOR

TECHNICAL FIELD

The present invention relates to a mobile communication system that supports multi-antenna transmission, a user terminal, and a processor.

BACKGROUND ART

An LTE system of which the specifications are formulated in 3GPP (3rd Generation Partnership Project), which is a project aiming to standardize a mobile communication system, supports downlink multi-antenna transmission (for example, see non patent document 1). For example, a base station can perform transmission with directing a beam toward one user terminal, and directing a null toward another user terminal.

In order to realize the downlink multi-antenna transmission in a FDD scheme, a user terminal feeds back precoder matrix information indicating a precoder matrix to a base station. Furthermore, the precoder matrix determines downlink transmission directionality.

Furthermore, in 3GPP, the standardization of coordinated transmission (CoMP; Coordinated Multi-Point) is in progress. In the CoMP, an antenna group (a base station) arranged in the same place is positioned as one "point" and a plurality of points communicate with a user terminal in coordination with one another. A point group that performs coordinated communication with a user terminal by using the same radio resource (time and frequency resource) is called a CoMP cooperating set.

PRIOR ART DOCUMENT

Non-Patent Document

Non-Patent Document 1: 3GPP technology specifications "TS 36.300 V11.0.0" (2011-12)

SUMMARY OF THE INVENTION

As a kind of the CoMP, CB (Coordinated Beamforming)-CoMP, in which a plurality of base stations perform spatial multiplexing transmission based on beamforming/null steering in coordination with one another, is discussed.

However, in the CB-CoMP, since a user terminal needs to perform the feedback of special precoder matrix information as well as the feedback of normal precoder matrix information, there is a problem that an operation amount and a consumption amount of a radio resource due to the feedback increase.

Therefore, the present invention provides a mobile communication system, a user terminal, and a processor, by which it is possible to realize efficient feedback.

According to an embodiment, a mobile communication system performs multi-antenna transmission by applying a precoder matrix for determining transmission directionality. The mobile communication system comprises a user terminal that starts feedback of predetermined precoder matrix information to a node in response to an instruction from the node controlling communication. The predetermined precoder matrix information is used to decide the precoder matrix that is applied to transmission to another user terminal different from the user terminal. The user terminal comprises: a control unit that switches whether to stop the feedback after starting the feedback in response to the instruction.

BRIEF DESCRIPTION OF THE DRAWINGS

FIG. 14 is a diagram for explaining a specific example of a codebook for each number of transmission antennas.
FIG. 19 is a diagram illustrating an operation environment (part 1) according to another embodiment.
FIG. 20 is a diagram illustrating an operation environment (part 1) according to another embodiment.
FIG. 21 is a diagram illustrating an operation environment (part 2) according to another embodiment.
FIG. 22 is a diagram illustrating an operation environment (part 2) according to another embodiment.

DESCRIPTION OF THE EMBODIMENT

[Overview of Embodiment]

Figure 1:
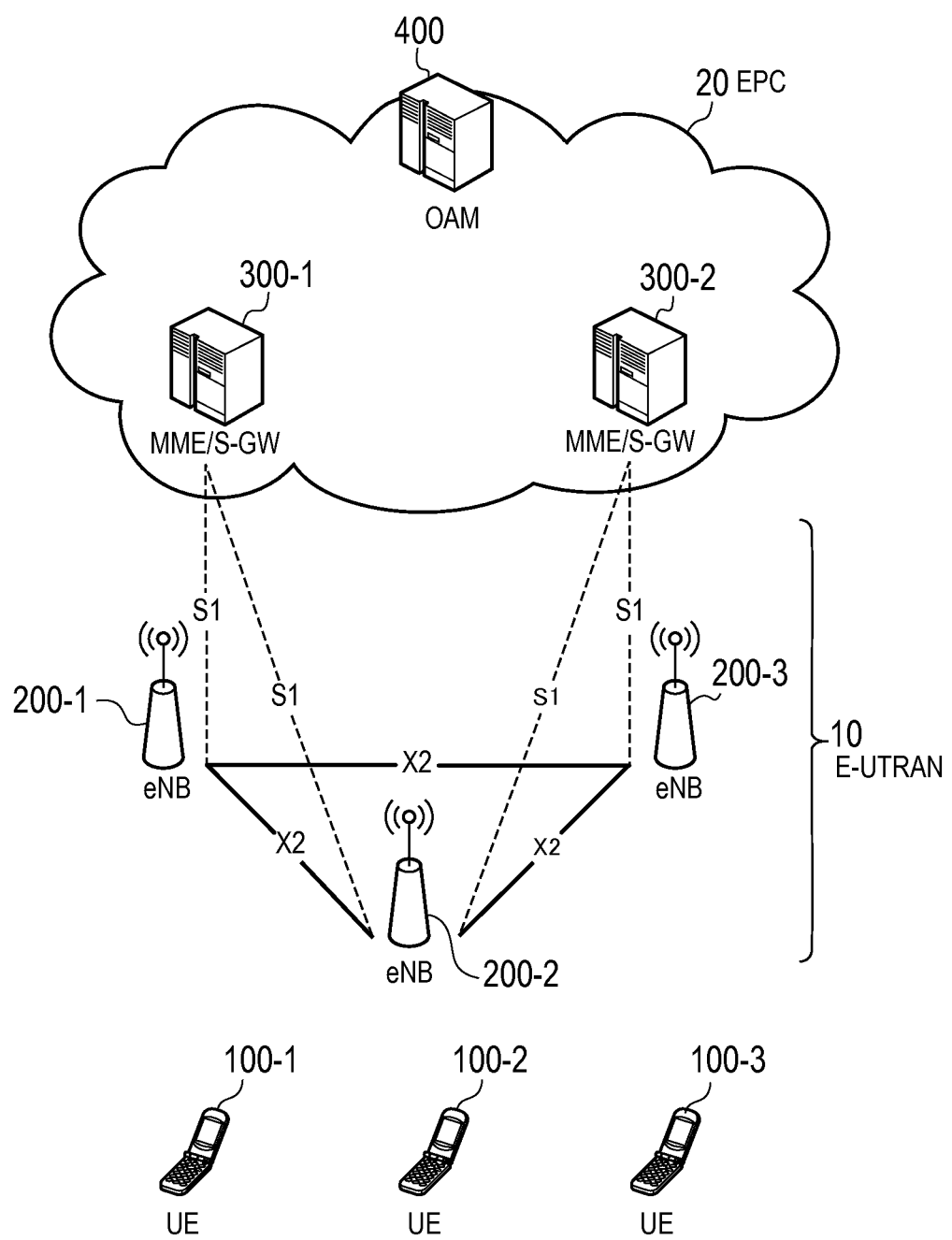
FIG. 1 is a configuration diagram of an LTE system.

A mobile communication system according to an embodiment performs downlink multi-antenna transmission by applying a precoder matrix for determining downlink transmission directionality. The mobile communication system includes a user terminal that starts the feedback of predetermined pre coder matrix information in response to an instruction from a base station. The predetermined precoder matrix information is used to decide the precoder matrix that is applied to transmission to another user terminal different from the user terminal. The user terminal includes a control unit that switches whether to stop the feedback after starting the feedback in response to the instruction. In this way, even after the feedback of the predetermined precoder matrix information is started in response to the instruction from the base station, it is possible to stop the feedback in response to a situation, so that it is possible to reduce an operation amount and a consumption amount of a radio resource due to the feedback.

Here, the "node controlling communication" may be abase station or a user terminal (it is called an anchor terminal) performing communication with a base station as a representative of a plurality of user terminals that perform D2D communication that is direct device-to-device communication. Because the anchor terminal performs communication with a base station for the D2D communication, the anchor terminal (indirectly) controls the D2D communication.

In the embodiment, the node is a base station that manages a cell connecting with the user terminal. A neighboring base station adjacent to the base station supports cooperative transmission for performing the multi-antenna transmission in downlink in cooperation with the base station. The predetermined precoder matrix information is used to decide the precoder matrix that is applied to transmission to the other user terminal in the neighboring base station. In this way, under the environment in which the base station and the neighboring base station perform the downlink multi-antenna transmission in cooperation with each other, it is possible to reduce an operation amount and a consumption amount of a radio resource due to feedback.

In the embodiment, after the feedback is started in response to the instruction, when it is determined that only a radio signal corresponding to one transmission antenna is received from the neighboring base station, the control unit stops the feedback. Due to the influence of shadowing and the like, when the user terminal receives only the radio signal corresponding to one transmission antenna from the neighboring base station, since the feedback of the predetermined precoder matrix information is not necessary, the feedback is stopped, so that it is possible to efficiently reduce an operation amount and a consumption amount of a radio resource due to the feedback.

In the embodiment, after the feedback is started in response to the instruction, when it is determined that a time division duplex scheme is applied to the neighboring base station, the control unit stops the feedback. When the time division duplex scheme is applied to the neighboring base station, since the feedback of the predetermined precoder matrix information is not necessary, the feedback is stopped, so that it is possible to efficiently reduce an operation amount and a consumption amount of a radio resource due to the feedback.

In the embodiment, the predetermined precoder matrix information is received in the base station and is transferred from the base station to the neighboring base station via an inter-base station interface. After the feedback is started in response to the instruction, when it is determined that the neighboring base station does not support the inter-base station interface, the control unit stops the feedback. When the neighboring base station does not support the inter-base station interface, since the feedback of the predetermined precoder matrix information is not necessary, the feedback is stopped, so that it is possible to efficiently reduce an operation amount and a consumption amount of a radio resource due to the feedback.

In the embodiment, the node is a base station that manages a cell connecting with the user terminal. After the feedback is started in response to the instruction, when it is determined that the neighboring base station adjacent to the base station does not support cooperative transmission for performing the multi-antenna transmission in downlink in cooperation with the base station, the control unit stops the feedback. When the neighboring base station does not support the cooperative transmission, since the feedback of the predetermined precoder matrix information is not necessary, the feedback is stopped, so that it is possible to efficiently reduce an operation amount and a consumption amount of a radio resource due to the feedback.

In the embodiment, after the feedback is started in response to the instruction, the control unit checks with the node that the stop of the feedback is permitted, and then stops the feedback. In this way, the node is able to recognize that the feedback of the predetermined precoder matrix information is stopped, thereby performing an appropriate internal process.

In the embodiment, after the feedback is started in response to the instruction, when the feedback is stopped, the control unit transmits a feedback stop notification to the node or feeds back an invalid value. In this way, the node is able to recognize that the feedback of the predetermined precoder matrix information is stopped, thereby performing an appropriate internal process.

In the embodiment, the user terminal further includes a storage unit that stores a plurality of codebooks, which are provided for each number of transmission antennas that are used in the multi-antenna transmission in downlink, and include candidates of the predetermined precoder matrix information. After the feedback is started in response to the instruction, when the feedback is continued, the control unit switches a codebook, which is used in the feedback, on the basis of the number of transmission antennas that are recognized from a radio signal received from the neighboring base station. In this way, due to the influence of shadowing and the like, when the number of transmission antennas recognized by the user terminal is smaller than the actual number of transmission antennas, codebooks corresponding to the number of transmission antennas recognized by the user terminal are used, so that it is possible to efficiently reduce an operation amount for selecting predetermined precoder matrix information to be fed back.

In the embodiment, after the feedback is started in response to the instruction, when the feedback is continued, the control unit feeds back an invalid transmission antenna number that is recognized from a radio signal received from the neighboring base station. The control unit performs an operation for selecting the predetermined precoder matrix information to be fed back from candidates of the predetermined precoder matrix information by employing only a valid transmission antenna number as a target. In this way, it is possible to efficiently reduce an operation amount for selecting the predetermined precoder matrix information to be fed back.

In the embodiment, the base station and the neighboring base station switch a scheme of the cooperative transmission in response to the stop of the feedback. In this way, in response to the stop of the feedback of the predetermined precoder matrix information, it is possible to switch a cooperative transmission scheme not requiring the feedback.

In another embodiment, the node is a base station that manages a cell connecting with the user terminal. The base station supports spatial multiplexing for spatially multiplexing the user terminal and the other user terminal by the multi-antenna transmission in downlink. The predetermined precoder matrix information is used to decide the precoder matrix that is applied to transmission to the other user terminal in the base station. In this way, under the environment in which the base station performs spatial multiplexing (MU-MIMO) for spatially multiplexing the user terminal and the other user terminal, it is possible to reduce an operation amount and a consumption amount of a radio resource due to feedback.

In the other embodiment, the node controlling the communication is a base station controlling D2D communication that is direct device-to-device communication. The predetermined precoder matrix information is used to decide the precoder matrix that is applied to transmission to the other user terminal from a third user terminal that performs the D2D communication with the other user terminal. The base station transmits information indicating the precoder matrix decided based on the predetermined precoder matrix information, to the other user terminal.

A user terminal according to the embodiment is used in a mobile communication system, which performs multi-antenna transmission by applying a pre coder matrix for determining transmission directionality. The user terminal comprises a control unit that starts feedback of predetermined precoder matrix information to a node in response to an instruction from the node controlling communication. The predetermined precoder matrix information is used to decide the precoder matrix that is applied to transmission to another user terminal different from the user terminal. The control unit switches whether to stop the feedback after starting the feedback in response to the instruction.

A processor according to the embodiment is provided in a user terminal in a mobile communication system that performs multi-antenna transmission by applying a precoder matrix for determining transmission directionality. The processor starts feedback of predetermined precoder matrix information to a node in response to an instruction from the node controlling communication. The predetermined precoder matrix information is used to decide the precoder matrix that is applied to transmission to another user terminal different from the user terminal. The processor switches whether to stop the feedback after starting the feedback in response to the instruction.

[First Embodiment]

Hereinafter, with reference to the accompanying drawings, a description will be provided for an embodiment when the present invention is applied to a mobile communication system (an LTE system) configured according to 3GPP standards.

(LTE system)

FIG. 1 is a configuration diagram of the LTE system according to the present embodiment.

As illustrated in FIG. 1, the LTE system includes a plurality of UEs (User Equipments) 100, E-UTRAN (Evolved Universal Terrestrial Radio Access Network) 10, and EPC (Evolved Packet Core) 20. The E-UTRAN 10 corresponds to a radio access network and the EPC 20 corresponds to a core network.

The UE 100 is a mobile radio communication device and performs radio communication with a cell (a serving cell) with which a connection is established. The UE 100 corresponds to the user terminal.

The E-UTRAN 10 includes a plurality of eNBs 200 (evolved Node-Bs). The eNB 200 corresponds to a base station. The eNB 200 constitutes a cell and performs radio communication with UE 100 established a connection with the cell.

It is noted that the "cell" is used as a term indicating a minimum unit of a radio communication area, and is also used as a term indicating a function of performing radio communication with the UE 100.

The eNB 200, for example, has a radio resource management (RRM) function, a routing function of user data, and a measurement control function for mobility control and scheduling.

The EPC 20 includes MMEs (Mobility Management Entities)/S-GWs (Serving-Gateways) 300, and OAM 400 (Operation and Maintenance).

The MME is a network node for performing various mobility controls, for example, for the UE 100 and corresponds to a controller. The S-GW is a network node that performs transfer control of user data and corresponds to a mobile switching center.

The eNBs 200 are connected mutually via an X2 interface. In the present embodiment, the X2 interface corresponds to an inter-base station interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
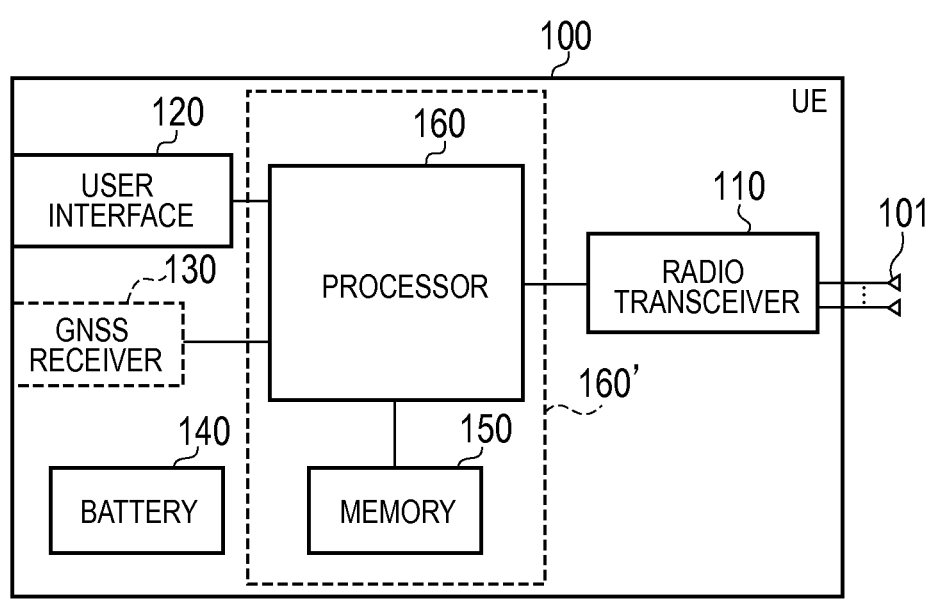
FIG. 2 is a block diagram of UE.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. In the present embodiment, the memory 150 corresponds to a storage unit and the processor 160 corresponds to a control unit.

The UE 100 may not have the GNSS receiver 130. Furthermore, the memory 150 may be integrally formed with the processor 160, and this set (that is, a chipset) may be called a processor 160'.

The antenna 101 and the radio transceiver 110 are used to transmit and receive a radio signal. The radio transceiver 110 converts a baseband signal output from the processor 160 into the radio signal, and transmits the radio signal from the antenna 101. Furthermore, the radio transceiver 110 converts the radio signal received by the antenna 101 into the baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 accumulates a power to be supplied to each block of the UE 100.

The memory 150 stores a program to be executed by the processor 160 and information to be used for a process by the processor 160.

The processor 160 includes a baseband processor that performs modulation and demodulation, encoding and decoding and the like of the baseband signal, and a CPU (Central Processing Unit) that performs various processes by executing the program stored in the memory 150. The processor 160 may further include a codec that performs encoding and decoding of sound and video signals. The processor 160 implements various processes and various communication protocols described later.

In the present embodiment, the processor 160 generates channel status information (CSI) on the basis of a signal received by the radio transceiver 110 (particularly, a reference signal), and then feeds back the channel status information to the serving cell or the neighboring cell. The channel status information includes PMI (Precoding Matrix Indicator), RI (Rank Indicator), and CQI (Channel Quality Indicator), for example.

In addition, the memory 150 holds a set (a codebook) of candidates of the PMI, and the processor 160 selects one PMI from the codebook and feeds back the PMI.

An "entire downlink band" or a "subband" is stipulated as the frequency unit (the target frequency band) that is to be fed back, and which one of them to use is determined in accordance with the instruction from the eNB 200. A subband is a frequency unit obtained by dividing the entire downlink band, and includes the bandwidth of a plurality of resource blocks. The details of the information that is fed back (such as the PMI, the RI, and the CQI) are described later.

Figure 3:
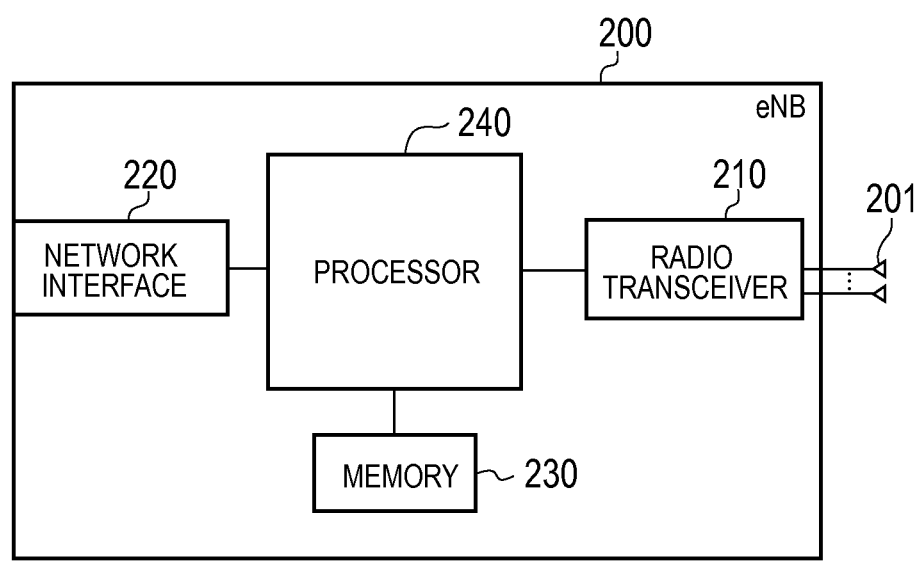
FIG. 3 is a block diagram of eNB.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a control unit. The memory 230 may be integrally formed with the processor 240, and this set (that is, a chipset) may be called a processor.

The antenna 201 and the radio transceiver 210 are used to transmit and receive a radio signal. The radio transceiver 210 converts the baseband signal output from the processor 240 into the radio signal, and transmits the radio signal from the antenna 201. Furthermore, the radio transceiver 210 converts the radio signal received by the antenna 201 into the baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes the baseband processor that performs modulation and demodulation, encoding and decoding and the like of the baseband signal and a CPU that performs various processes by executing the program stored in the memory 230. The processor 240 implements various processes and various communication protocols described later.

Figure 4:
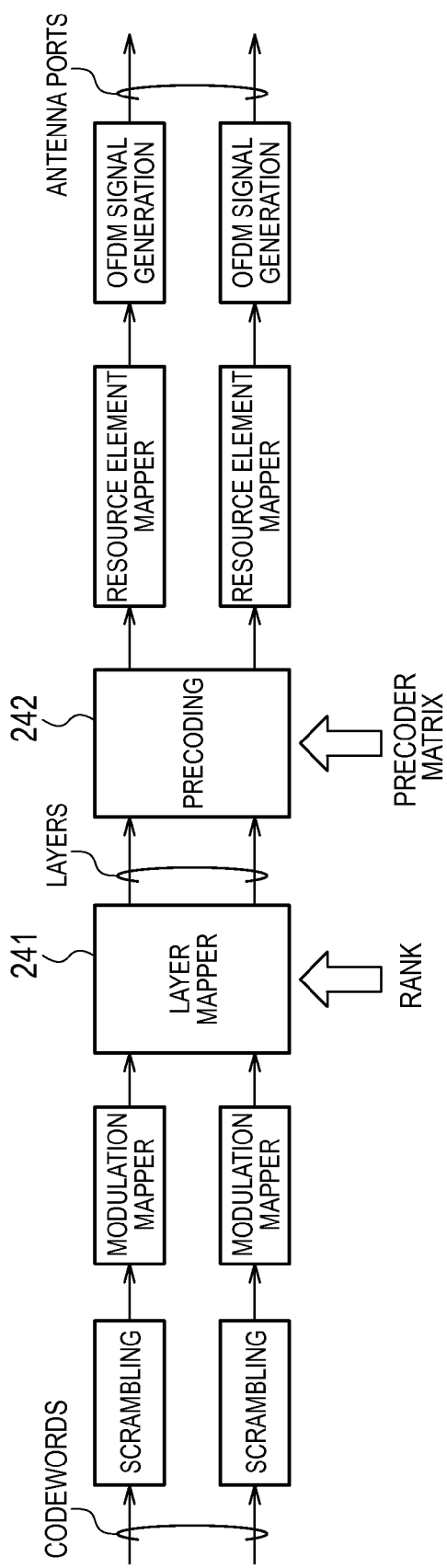
FIG. 4 is a block diagram related to downlink multi-antenna transmission.

In the present embodiment, the processor 240 performs downlink multi-antenna transmission by applying the precoder matrix and the rank. FIG. 4 is a block diagram of the processor 240 related to the downlink multi-antenna transmission. The details of each block are described in 3GPP TS 36.211, for example. However, an overview of each block will be described herein.

As illustrated in FIG. 4, one or two codewords to be transmitted via a physical channel are scrambled, are modulated into a modulation symbol, and then are mapped to a plurality of layers by a layer mapper 241. The codeword is an error correction data unit. The rank (number of layers) is determined on the basis of the RI that is fed back.

A precoder 242 precodes a modulation symbol of each layer by using a precoder matrix. The precoder matrix is determined on the basis of the PMI that is fed back. The precoded modulation symbol is mapped to a resource element, is converted into an OFDM signal of a temporal domain, and is output to each antenna port.

Figure 5:
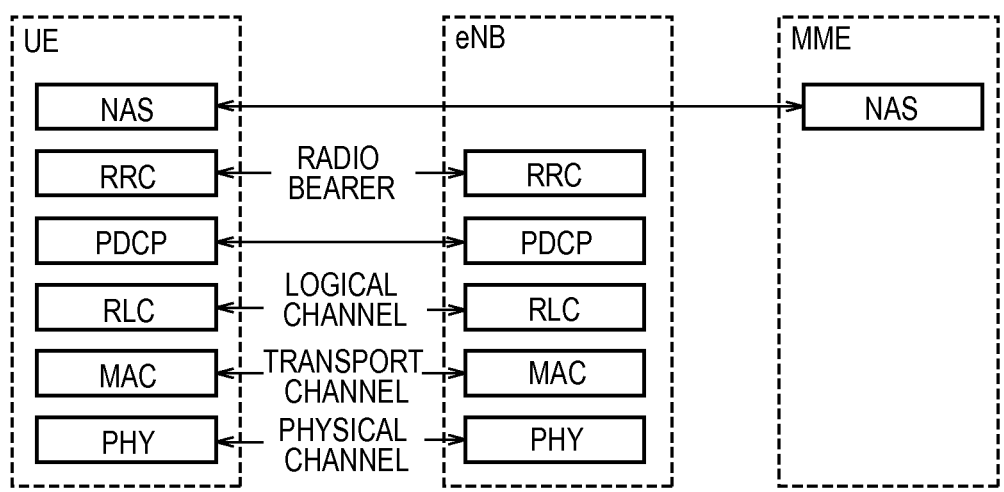
FIG. 5 is a protocol stack diagram of a radio interface in the LTE system.

FIG. 5 is a protocol stack diagram of a radio interface in the LTE system.

As illustrated in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via the physical channel.

The MAC layer performs preferential control of data, and a retransmission process and the like by hybrid ARQ (HARQ). Between the MAC layer of the UE 100 and the MAC layer of the eNB 200, data is transmitted via a transport channel. The MAC layer of the eNB 200 includes a scheduler for determining a transport format (a transport block size, a modulation and coding scheme, and the like) of an uplink and a downlink, and an assignment resource block.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various types of setting is transmitted. The RRC layer controls the logical channel, the transport channel, and the physical channel in response to establishment, re-establishment, and release of a radio bearer. When there is an RRC connection between the RRC of the UE 100 and the RRC of the eNB 200, the UE 100 is in a connected state (RRC Connected State), and otherwise, the UE 100 is in an idle state (RRC Idle State).

A NAS (Non-Access Stratum) layer positioned above the RRC layer performs session management or mobility management, for example.

Figure 6:
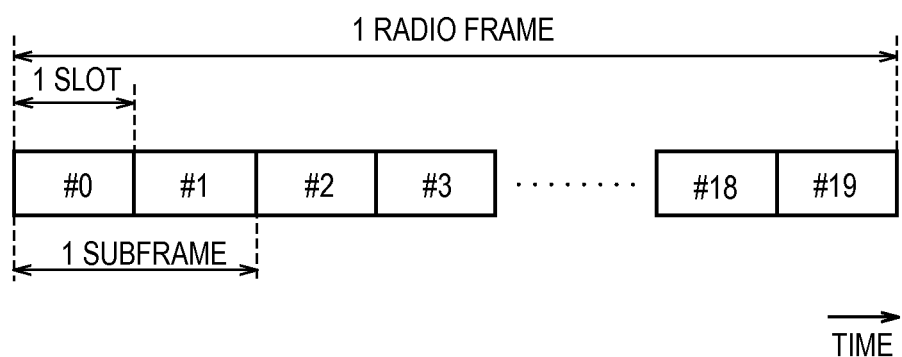
FIG. 6 is a configuration diagram of a radio frame used in the LTE system.

FIG. 6 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As a duplex scheme, either a FDD (Frequency Division Duplex) scheme or a TDD (Time Division Duplex) scheme is used. However, in the present embodiment, the FDD scheme is mainly assumed.

As illustrated in FIG. 6, the radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each symbol is provided at a head thereof with a guard interval called acyclic prefix (CP). The resource block includes a plurality of subcarriers in the frequency direction. A radio resource unit configured by one subcarrier and one symbol is called a resource element (RE).

Among radio resources assigned to the UE 100, a frequency resource can be designated by a resource block and a time resource can be designated by a subframe (or slot).

In the downlink, an interval of several symbols at the head of each subframe is a control region mainly used as a physical downlink control channel (PDCCH). Furthermore, the remaining interval of each subframe is a region mainly used as a physical downlink shared channel (PDSCH). Moreover, in each subframe, reference signals such as cell-specific reference signals (CRSs) are distributed and arranged.

The PDCCH carries the control information. The control information, for example, includes the uplink SI (Scheduling Information), the downlink SI, and a TPC bit. The uplink SI is information indicating the assignment of uplink radio resources, and the downlink SI is information indicating the assignment of downlink radio resources. The TPC bit is information for instructing an increase or decrease in the uplink transmission power.

The PDSCH carries the control information and/or user data. For example, a downlink data region may be assigned only to the user data, or may be assigned such that the user data and the control information are multiplexed.

In the uplink, both ends, in the frequency direction, of each subframe are control regions mainly used as a physical uplink control channel (PUCCH). Furthermore, the center portion, in the frequency direction, of each subframe is a region mainly used as a physical uplink shared channel (PUSCH).

The PUCCH carries the control information. The control information includes, for example, the CQI, the PMI, the RI, the SR (Scheduling Request), and the ACK/NACK.

The CQI is information (an index) indicating a modulation and coding scheme (that is, recommended MCS), which is preferable to be used in the downlink, based on a downlink reception status.

The PMI is information (an index) indicating a precoder matrix that is preferable to be used in the downlink. In other words, the PMI indicates a precoder matrix in which a beam is directed toward UE that is a transmission source of the PMI. For example, in order for the reception status of the UE 100 to improve, the UE 100 selects the PMI to be fed back to the eNB 200.

The RI is information (an index) indicating a rank that is preferable to be used in the downlink. For example, in order for the rank corresponding to the reception status of the UE 100 to be applicable, the UE 100 selects the PMI to be fed back to the eNB 200.

The SR is information for requesting the assignment of uplink radio resources.

The ACK/NACK is information indicating whether or not the decoding of a signal transmitted via a downlink physical channel (for example, the PDSCH) is successful.

The PUSCH is a physical channel that carries the control information and/or user data. For example, an uplink data region may be assigned only to the user data, or may be assigned such that the user data and the control information are multiplexed.

(Operation According to First Embodiment)

Figure 7:
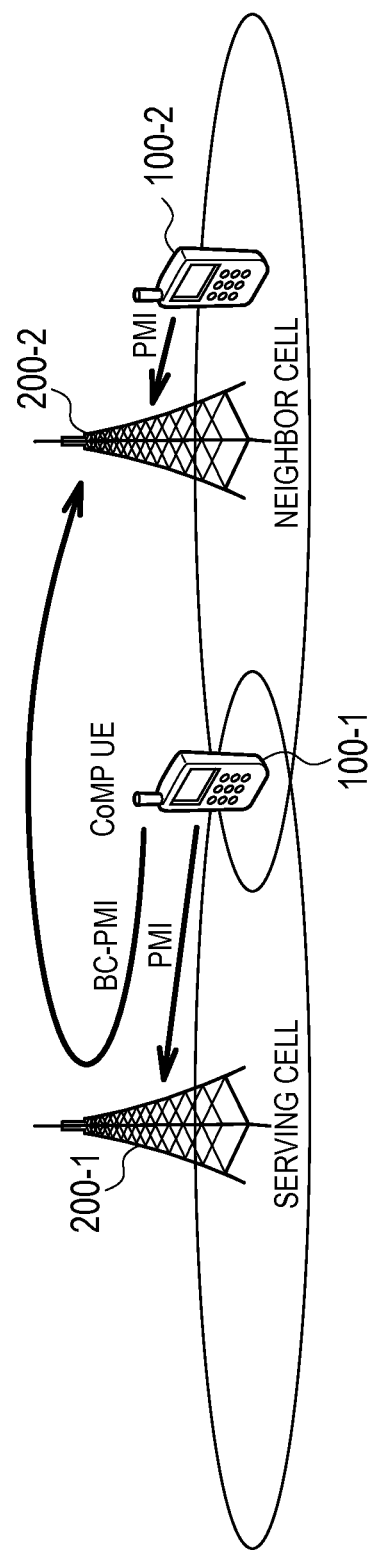
FIG. 7 is a diagram illustrating an operation environment according to a first embodiment through a fourth embodiment.
Figure 8:
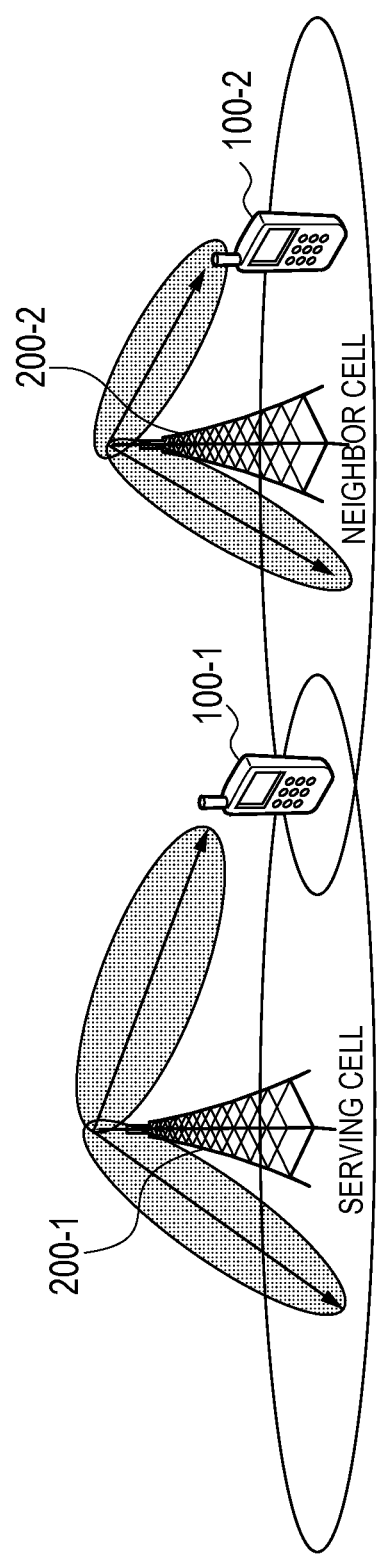
FIG. 8 is a diagram illustrating an operation environment according to the first embodiment through the fourth embodiment.

Hereinafter, an operation according to the present embodiment will be described. FIG. 7 and FIG. 8 are diagrams illustrating operation environments according to the present embodiment. In FIG. 7 and FIG. 8, eNB 200-1 and eNB 200-2 constitute cells adjacent to each other, and that is, are in the adjacency relation.

As illustrated in FIG. 7, UE 100-1 establishes a connection with the cell of the eNB 200-1. That is, the UE 100-1 performs communication by assuming the cell of the eNB 200-1 as the serving cell. The UE 100-1 is located at a boundary area of the cells of the eNB 200-1 and the eNB 200-2. In such a case, normally, the UE 100-1 is influenced by interference from the cell of the eNB 200-2.

UE 100-2 establishes a connection with the cell of the eNB 200-2. That is, the UE 100-2 performs communication by assuming the cell of the eNB 200-2 as the serving cell. FIG. 7 illustrates only one UE 100-2. However, a plurality of UEs 100-2 may establish a connection with the cell of the eNB 200-2.

The eNB 200-1 and the eNB 200-2 perform CB-CoMP in order to improve throughput of the UE 100-1 located at the edge of the cell. In the CB-CoMP, the serving cell of the UE 100-1 may be called an "anchor cell". In the CB-CoMP, the eNB 200-2 acting as a main interference source adjusts transmission directionality such that the influence of interference given to the UE 100-1 is reduced.

The UE 100-1, which is an object of the CB-CoMP, performs special feedback in response to an instruction from the eNB 200-1, in addition to normal feedback (PMI, RI, and CQI) for the eNB 200-1. In the present embodiment, the UE 100-1 feeds back the special PMI to the eNB 200-2 via the eNB 200-1. However, the UE 100-1 may directly feedback the special PMI to the eNB 200-2 without passing through the eNB 200-1.

The normal PMI is information (an index) indicating a precoder matrix in which a beam is directed toward the UE 100-1 at the time of transmission from the eNB 200-1 to the UE 100-1. On the basis of a reference signal and the like that are received from the eNB 200-1, the UE 100-1 feeds back the normal PMI such that a reception level from the eNB 200-1 is improved.

The special PMI is information (an index) indicating a precoder matrix in which a null is directed toward the UE 100-1 at the time of transmission from the eNB 200-2 to the UE 100-1. Such PMI is called BC (Best Companion)-PMI. On the basis of a reference signal and the like that are received from the eNB 200-2, the UE 100-1 feeds back the BC-PMI such that a reception level (that is, an interference level) from the eNB 200-2 is reduced. In the present embodiment, the BC-PMI corresponds to predetermined precoder matrix information.

Meanwhile, the UE 100-2 performs normal feedback (PMI, RI, and CQI) for the eNB 200-2.

The eNB 200-2 assigns a radio resource, which is equal to that assigned to the UE 100-1, to the UE 100-2 in the cell of the eNB 200-2, which feeds back PMI that coincides with the BC-PMI from the UE 100-1. In this case, the eNB 200-2 must dynamically or quasi-statically share the scheduling information of the UE 100-1 with the eNB 200-1. Then, the eNB 200-2 performs transmission to the UE 100-2 according to the coinciding PMI.

As a result, as illustrated in FIG. 8, the eNB 200-2 can perform transmission to the UE 100-2 by directing a beam to the UE 100-2 while directing a null to the UE 100-1. In this way, it is possible to spatially multiplex (separate) the UE 100-2 with the UE 100-1, so that it is possible to suppress interference to the UE 100-1 and improve the throughput of the UE 100-1. In addition, the eNB 200-1 performs transmission to the UE 100-1 according to the normal PMI fed back from the UE 100-1. As a result, the eNB 200-1 is able to direct a beam to the UE 100-1.

However, when there is no UE 100-2 in the cell of the eNB 200-2 that feeds back the PMI that coincides with the BC-PMI from the UE 100-1, the eNB 200-2 may perform two operations, that is, an operation of not assigning the radio resource which is equal to that assigned to the UE 100-1, or an operation of assigning the radio resource even in a non-coinciding PMI. However, the two operations are not preferable from the standpoint of resource use efficiency improvement and interference suppression.

In the present embodiment, in order to increase an option of a precoder matrix to be applied to transmission to the UE 100-2, the UE 100-1 feeds back a plurality of BC-PMIs. For example, the UE 100-1 selects a plurality of PMIs, in which an interference level from the eNB 200-2 is smaller than a threshold value, as BC-PMIs and feeds back the BC-PMIs. Alternatively, the UE 100-1 selects a predetermined number of PMIs in order from PMI with the lowest interference level from the eNB 200-2 as BC-PMIs, and feeds back the BC-PMIs.

In this case, the eNB 200-2 assigns the radio resource, which is equal to that assigned to the UE 100-1, to the UE 100-2 in the cell of the eNB 200-2, which feeds back PMI that coincides with one of a plurality of BC-PMIs from the UE 100-1. Then, the eNB 200-2 performs transmission to the UE 100-2 according to the coinciding PMI.

As described above, the UE 100-1 feeds back the plurality of BC-PMIs as well as the normal PMI, so that it is possible to increase the probability that the BC-PMIs and the PMI coincide with each other in the eNB 200-2. However, this causes an increase in an operation amount and a consumption amount of a radio resource due to the feedback of the BC-PMIs.

In this regard, after starting the feedback of the BC-PMIs in response to an instruction from the eNB 200-1, the UE 100-1 switches whether to stop the feedback of the BC-PMIs. In the present embodiment, a determination entity that determines whether to stop the feedback of the BC-PMIs is the UE 100-1. The feedback of the BC-PMIs is stopped in response to a situation, so that it is possible to reduce an operation amount and a consumption amount of a radio resource due to the feedback of the BC-PMIs.

Figure 9:
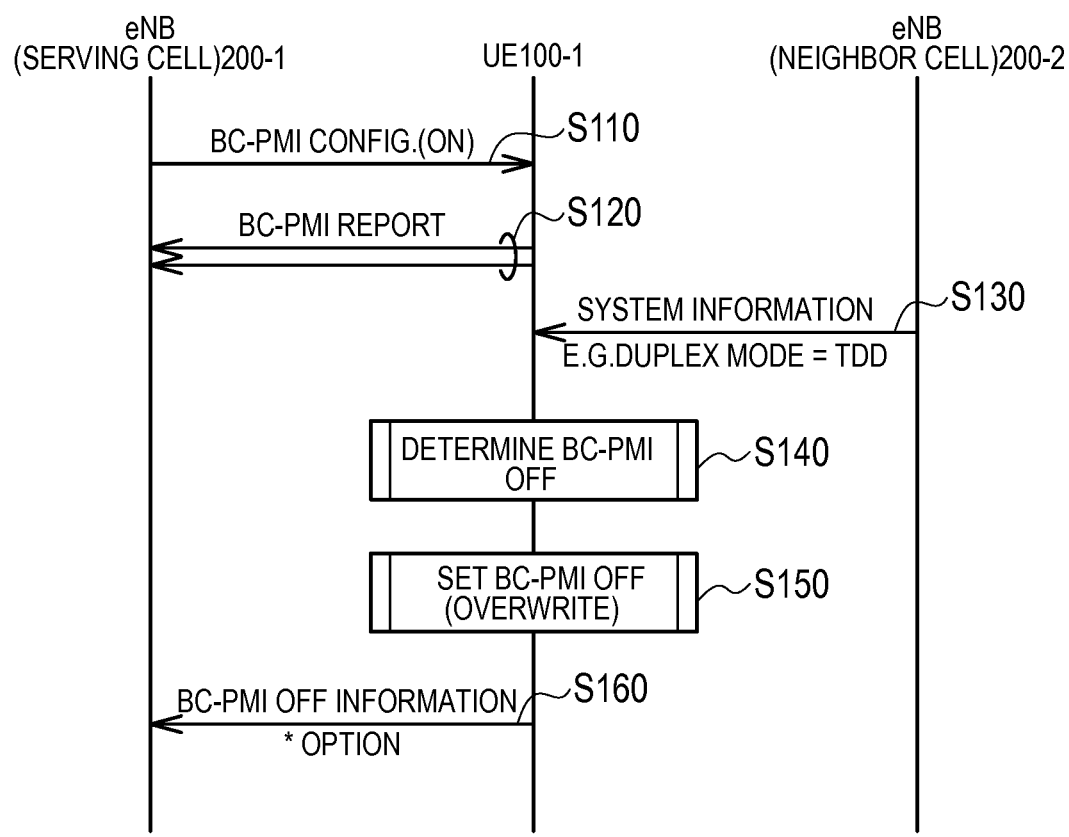
FIG. 9 is an operation sequence diagram according to the first embodiment.

FIG. 9 is an operation sequence diagram according to the present embodiment.

As illustrated in FIG. 9, in step S110, the eNB 200-1 instructs the UE 100-1 to start (ON) the feedback of the BC-PMI. The instruction may be an RRC message (a BC-PMI Config. message) transmitted through an RRC layer or an MAC control element (a BC-PMI Request) transmitted through an MAC layer. Alternatively, the instruction may be transmitted as system information. The system information is transmitted through BCCH that is a kind of a logical channel. A master information block (MIB) of the system information is mapped to BCH that is a kind of a transport channel. A system information block (SIB) of the system information is mapped to DL-SCH that is a kind of a transport channel. In the present embodiment, the eNB 200-1 instructs the UE 100-1 to start (ON) the feedback of the BC-PMI through the BC-PMI Config. message.

In step S120, the UE 100-1 starts (ON) the feedback of the BC-PMI in response to the instruction from the eNB 200-1. In the present embodiment, the BC-PMI is received in the eNB 200-1 and is transferred to the eNB 200-2 from the eNB 200-1 on the X2 interface.

In step S130, the eNB 200-2 transmits the system information. In the present embodiment, the system information transmitted by the eNB 200-2 includes Capability information indicating the capability of the eNB 200-2. The Capability information includes first information indicating a duplex scheme that is applied to the eNB 200-2, second information indicating the presence or absence of support of the X2 interface in the eNB 200-2, and third information indicating the presence or absence of support of the BC-PMI in the eNB 200-2. As the third information, a release number followed by the eNB 200-2 is available. This is because the eNB 200-2 before at least a release 10 does not support the BC-PMI. As the second information, in addition to the release number, information indicating a type of the eNB 200-2 is available. This is because a home base station (HeNB) of a release 8 or 9 does not support the X2 interface.

In step S140, the UE 100-1 determines whether to stop (OFF) the feedback of the BC-PMI on the basis of at least one of the system information received from the eNB 200-2 and a reference signal (for example, CRS; Cell Reference Signal) received from the eNB 200-2. Details of a stop determination process will be described later. Hereinafter, a description will be given on the assumption that the UE 100-1 determined to stop (OFF) the feedback of the BC-PMI.

In step S150, the UE 100-1 overwrites the setting from the eNB 200-1 in step S110 and sets to stop (OFF) the feedback of the BC-PMI.

In step S160, the UE 100-1 transmits a feedback stop notification of the BC-PMI to the eNB 200-1. Alternatively, the UE 100-1 may perform feedback of an invalid value (a Null value). In this way, the eNB 200-1 is able to recognize that the feedback of the BC-PMI was stopped, thereby performing an appropriate internal process.

However, the UE 100-1 may omit the process of step S160. In this case, the eNB 200-1, for example, detects timeout of the feedback of the BC-PMI and recognizes that the feedback of the BC-PMI was stopped.

Figure 10:
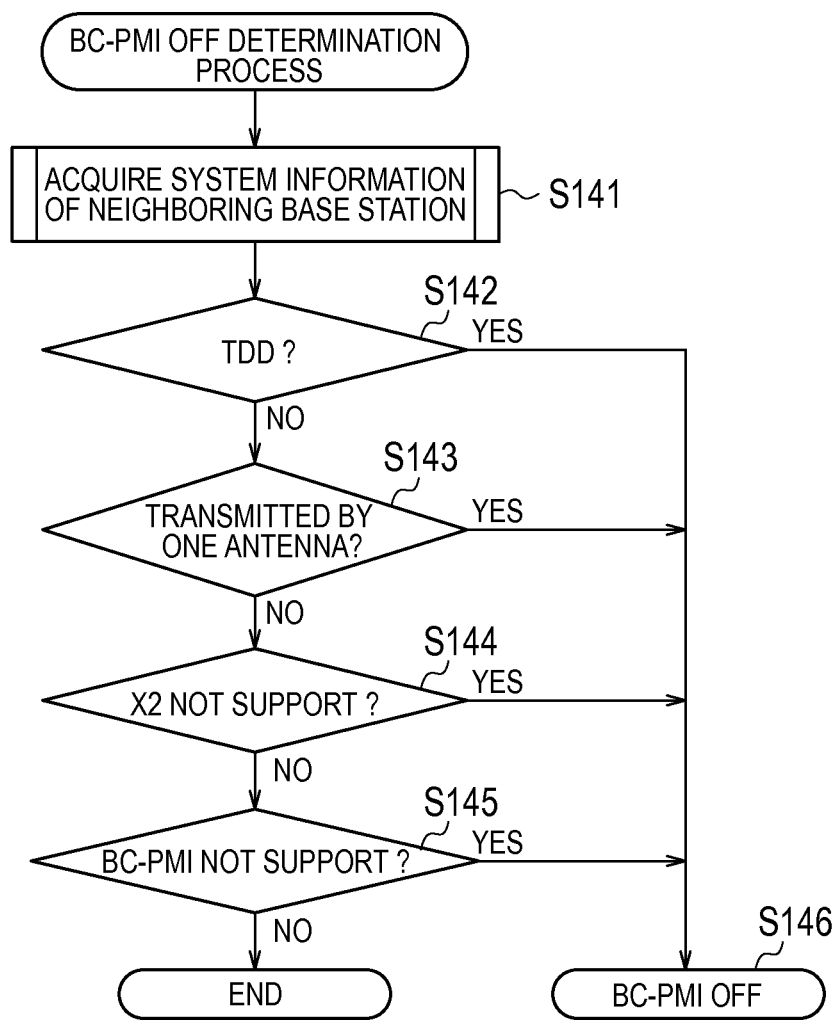
FIG. 10 is a process flow diagram of a stop determination process (step S140 of FIG. 9).

Next, details of the aforementioned stop determination process (step S140) will be described. FIG. 10 is a process flow diagram of the stop determination process (step S140).

As illustrated in FIG. 10, in step S141, the UE 100-1 acquires the system information from the eNB 200-2 (a neighboring base station).

In step S142, on the basis of the system information acquired in step S141, the UE 100-1 determines whether a duplex scheme applied to the eNB 200-2 is a time division duplex (TDD) scheme. When a determination result of step S142 is "Yes", the UE 100-1 determines to stop the feedback of the BC-PMI in step S146. This is because when the duplex scheme applied to the eNB 200-2 is the TDD scheme, the eNB 200-2 is able to obtain channel status information (CSI) of the UE 100-1 by using the reversibility of a propagation path, so that the feedback of the BC-PMI is not necessary.

In step S143, the UE 100-1 determines whether to receive only a radio signal corresponding to one transmission antenna from the eNB 200-2. Specifically, since the eNB 200-2 transmits a reference signal that differs in each transmission antenna (each antenna port), the UE 100-1 is able to determine whether to receive only the radio signal corresponding to one transmission antenna from the eNB 200-2 on the basis of the reference signal received from the eNB 200-2. When a determination result of step S143 is "Yes", the UE 100-1 determines to stop the feedback of the BC-PMI in step S146. This is because when the UE 100-1 receives only the radio signal corresponding to one transmission antenna from the eNB 200-2, the downlink multi-antenna transmission is not able to be applied between the eNB 200-2 and the UE 100-1, so that the feedback of the BC-PMI is not necessary.

In step S144, on the basis of the system information acquired in step S141, the UE 100-1 determines whether the eNB 200-2 supports the X2 interface. When a determination result of step S144 is "Yes", the UE 100-1 determines to stop the feedback of the BC-PMI in step S146. This is because when the eNB 200-2 does not support the X2 interface, it is not able to transfer the BC-PMI on the X2 interface, so that the feedback of the BC-PMI is not necessary.

In step S145, on the basis of the system information acquired in step S141, the UE 100-1 determines whether the eNB 200-2 supports the BC-PMI. When a determination result of step S145 is "Yes", the UE 100-1 determines to stop the feedback of the BC-PMI in step S146. This is because when the eNB 200-2 does not support the BC-PMI (that is, when the eNB 200-2 does not support the CB-CoMP), the feedback of the BC-PMI is not necessary.

In the present process flow, after the feedback of the BC-PMI is started, determination regarding whether to stop the feedback of the BC-PMI is performed. However, apart of the present flow is changed, so that the present flow is applicable to determination regarding whether to start (resume) the feedback of the BC-PMI after the feedback of the BC-PMI is stopped. Specifically, it is sufficient if "end" of the present flow is regarded as "feedback resumption (ON) of the BC-PMI" and step S146 of the present flow is regarded as "end".

Figure 11:
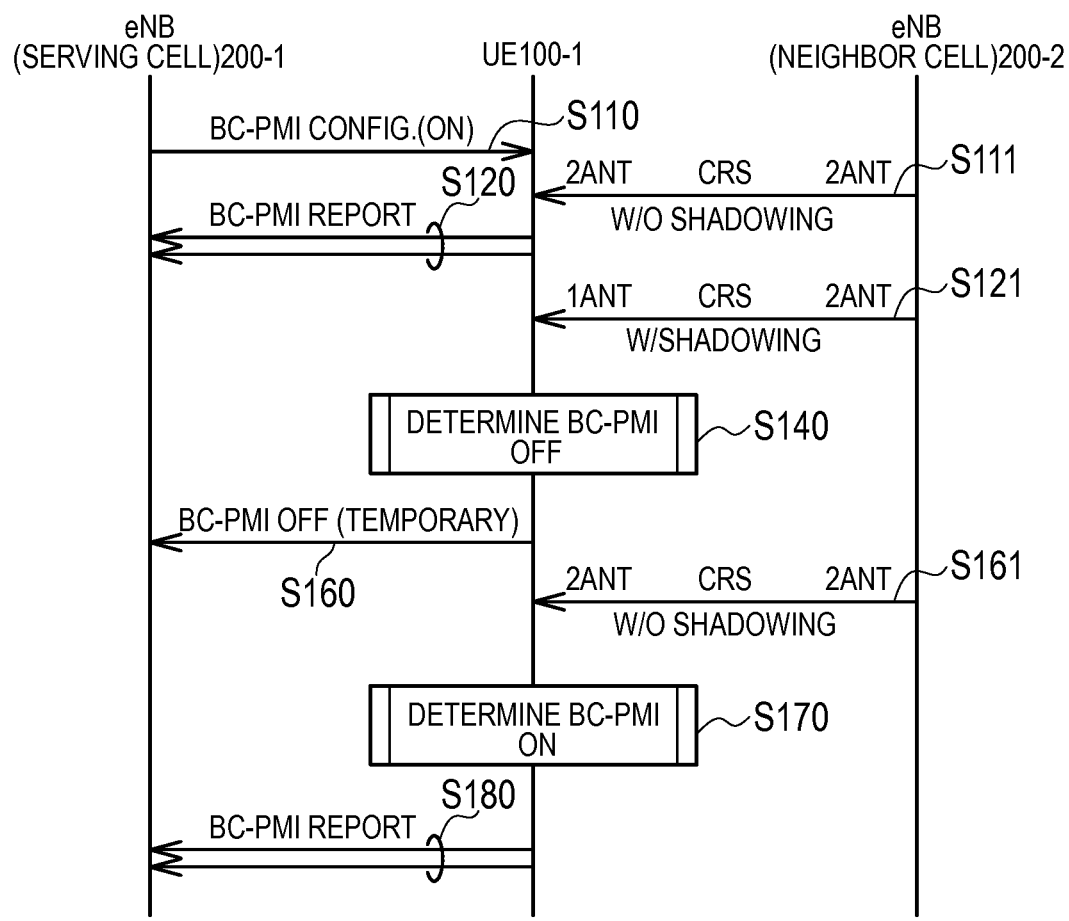
FIG. 11 is a sequence diagram illustrating a specific operation example according to the first embodiment.

FIG. 11 is a sequence diagram illustrating a specific operation example according to the present embodiment. Hereinafter, feedback ON/OFF determination based on the number of transmission antennas will be mainly described. Furthermore, a description for the aforementioned operation will be appropriately omitted.

As illustrated in FIG. 11, in step S110, the eNB 200-1 instructs the UE 100-1 to start (ON) the feedback of the BC-PMI.

In step S111, the eNB 200-2 transmits reference signals from each of two transmission antennas. Since these reference signals are not influenced by shadowing, the UE 100-1 receives the reference signals corresponding to the two transmission antennas.

In step S120, the UE 100-1 starts (ON) the feedback of the BC-PMI in response to the instruction from the eNB 200-1.

In step S121, the eNB 200-2 transmits reference signals from each of the two transmission antennas. Since these reference signals are influenced by shadowing, the UE 100-1 receives only the reference signal corresponding to one transmission antenna.

In step S140, on the basis of the reference signals received from the eNB 200-2, the UE 100-1 determines whether to stop (OFF) the feedback of the BC-PMI. Even though the eNB 200-2 transmits reference signals from each of the two transmission antennas, since the UE 100-1 receives only the reference signal corresponding to the one transmission antenna, the UE 100-1 determines to stop (OFF) the feedback of the BC-PMI.

In step S160, the UE 100-1 transmits a feedback stop notification of the BC-PMI to the eNB 200-1. Alternatively, the UE 100-1 may perform feedback of an invalid value (a Null value).

However, the UE 100-1 may omit the process of step S160. In this case, the eNB 200-1 recognizes that the feedback of the BC-PMI was stopped.

In step S161, the eNB 200-2 transmits reference signals from each of the two transmission antennas. Since these reference signals are not influenced by shadowing, the UE 100-1 receives the reference signals corresponding to the two transmission antennas.

In step S170, on the basis of the reference signals received from the eNB 200-2, the UE 100-1 determines whether to resume (ON) the feedback of the BC-PMI. Since the eNB 200-2 transmits reference signals from each of the two transmission antennas and the UE 100-1 receives the reference signals corresponding to the two transmission antennas, the UE 100-1 determines to resume (ON) the feedback of the BC-PMI.

In step S180, the UE 100-1 resumes (ON) the feedback of the BC-PMI.

[Second embodiment]

Hereinafter, a second embodiment will be described while focusing on differences from the aforementioned first embodiment.

In the first embodiment, a determination entity that determines whether to stop the feedback of the BC-PMI is the UE 100-1. On the other hand, in the second embodiment, a determination entity that determines whether to stop the feedback of the BC-PMI is the eNB 200-1.

Figure 12:
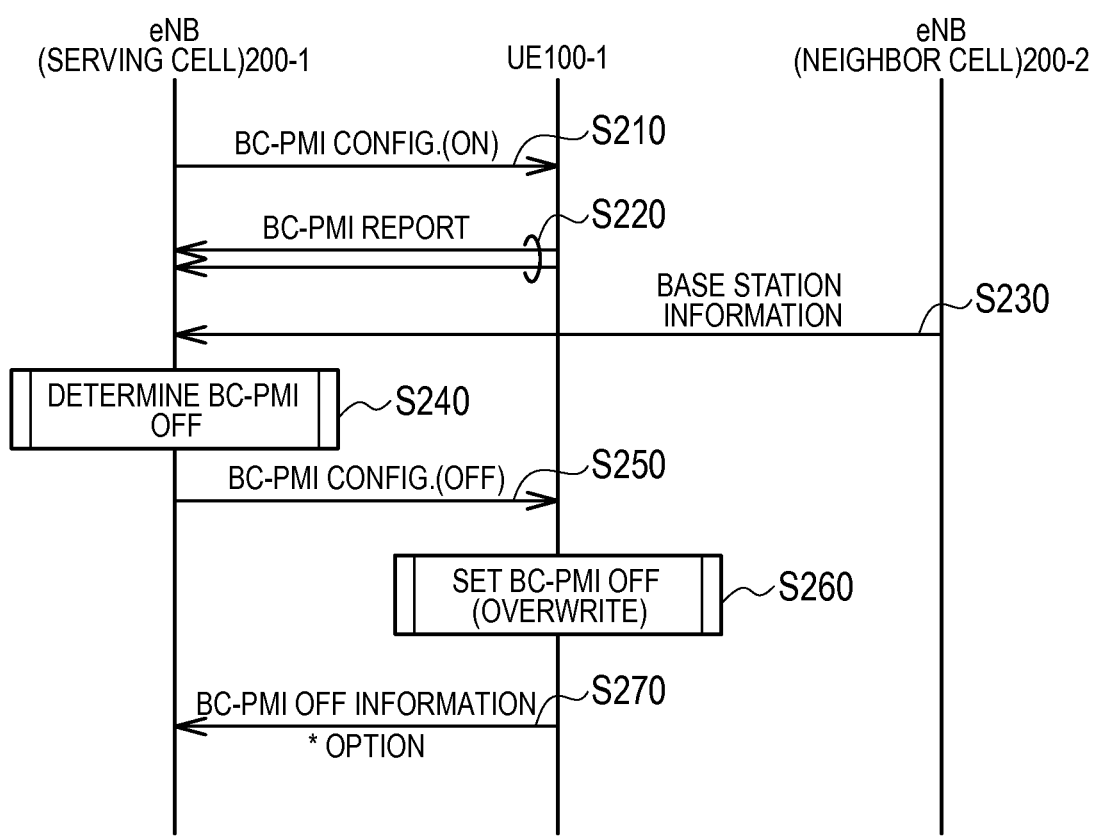
FIG. 12 is an operation sequence diagram according to the second embodiment.

FIG. 12 is an operation sequence diagram according to the present embodiment. A description for an operation the same as that of the first embodiment will be appropriately omitted.

As illustrated in FIG. 12, in step S210, the eNB 200-1 instructs the UE 100-1 to start (ON) the feedback of the BC-PMI.

In step S220, the UE 100-1 starts (ON) the feedback of the BC-PMI in response to the instruction from the eNB 200-1.

In step S230, the eNB 200-2 transmits base station information to the eNB 200-1 on the X2 interface or the S1 interface. In the present embodiment, the base station information transmitted by the eNB 200-2 includes Capability information indicating the capability of the eNB 200-2. The Capability information includes first information indicating a duplex scheme that is applied to the eNB 200-2, second information indicating the presence or absence of support of the X2 interface in the eNB 200-2, and third information indicating the presence or absence of support of the BC-PMI in the eNB 200-2. As the third information, a release number followed by the eNB 200-2 is available.

In step S240, the eNB 200-1 determines whether to stop (OFF) the feedback of the BC-PMI on the basis of the base station information received from the eNB 200-2 and the BC-PMI received from the UE 100-1. For this determination, a stop determination process flow (see FIG. 10) the same as that of the first embodiment is applicable. For example, when the BC-PMI received from the UE 100-1 is an abnormal value, the eNB 200-1 determines that the UE 100-1 receives only a radio signal corresponding to one transmission antenna from the eNB 200-2. Hereinafter, a description will be given on the assumption that the eNB 200-1 determined to stop (OFF) the feedback of the BC-PMI.

In step S250, the eNB 200-1 instructs the UE 100-1 to stop (OFF) the feedback of the BC-PMI. The instruction may be an RRC message (a BC-PMI Config. message) transmitted through an RRC layer or an MAC control element transmitted through an MAC layer. In the present embodiment, the eNB 200-1 instructs the UE 100-1 to stop (OFF) the feedback of the BC-PMI through the BC-PMI Config. message.

In step S260, the UE 100-1 sets to stop (OFF) the feedback of the BC-PMI in response to the instruction from the eNB 200-1.

In step S270, the UE 100-1 transmits a feedback stop notification of the BC-PMI to the eNB 200-1. Alternatively, the UE 100-1 may perform feedback of an invalid value (a Null value). However, the UE 100-1 may omit the process of step S260.

Figure 13:
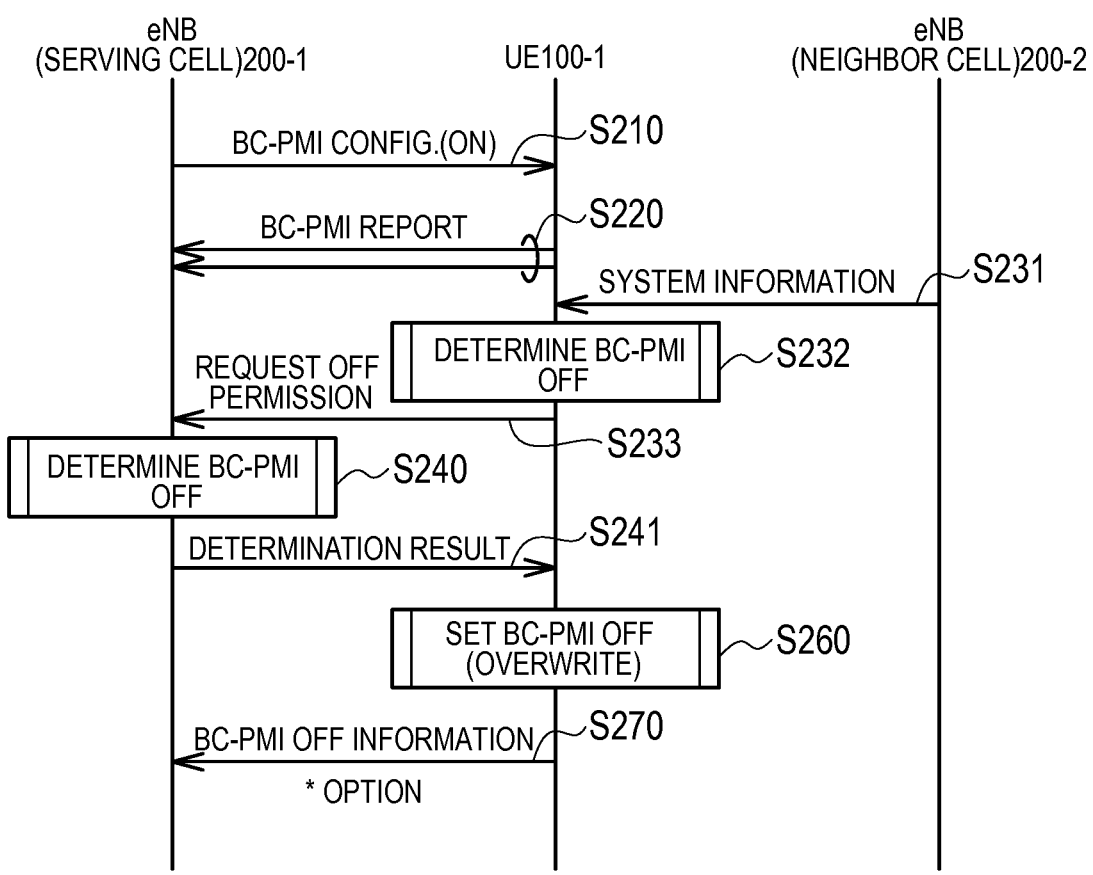
FIG. 13 is an operation sequence diagram according to a modification example of the second embodiment.

In addition, as a modification example of the second embodiment, both the UE 100-1 and the eNB 200-1 may perform the determination regarding whether to stop the feedback of the BC-PMI. FIG. 13 is an operation sequence diagram according to a modification example of the second embodiment.

As illustrated in FIG. 13, processes of step S210, S220, S231, and S232 are performed in the same manner as those of the first embodiment. Hereinafter, a description will be given on the assumption that the UE 100-1 determined to stop (OFF) the feedback of the BC-PMI.

In step S233, the UE 100-1 requests the eNB 200-1 to permit the stop of the feedback of the BC-PMI.

In step S240, the eNB 200-1 determines whether to permit the stop (OFF) of the feedback of the BC-PMI in response to the request from the UE 100-1. Hereinafter, a description will be given on the assumption that the eNB 200-1 permitted the stop (OFF) of the feedback of the BC-PMI.

In step S241, the eNB 200-1 notifies the UE 100-1 of a determination result of step S240. Alternatively, the eNB 200-1 may instruct the UE 100-1 to stop (OFF) the feedback of the BC-PMI. Subsequent processes (steps S260 and S270) are performed in the same manner as those of the first embodiment. As described above, in the present modification example, the UE 100-1 checks with the eNB 200-1 that the stop of the feedback of the BC-PMI is permitted, and then stops the feedback of the BC-PMI.

[Third embodiment]

Hereinafter, a third embodiment will be described while focusing on differences from the aforementioned first embodiment and second embodiment.

In the first embodiment and the second embodiment, the feedback of the BC-PMI is stopped (OFF), resulting in the reduction of an operation amount and a consumption amount of a radio resource.

On the other hand, in the third embodiment, even though the feedback of the BC-PMI is continued (ON), an operation amount is reduced, resulting in the reduction of a processing load and power consumption of the UE 100-1.

The memory 150 of the UE 100-1 stores a plurality of codebooks. The plurality of codebooks are provided for each number of transmission antennas that are used in the downlink multi-antenna transmission and include candidates of the BC-PMI. FIG. 14 is a diagram for explaining a specific example of a codebook for each number of transmission antennas.

As illustrated in FIG. 14, the memory 150 of the UE 100-1 stores a codebook for two transmission antennas, a codebook for four transmission antennas, . . . . The codebook for two transmission antennas includes a precoder matrix, in which weights of antennas #1 and #2 are combined with each other, and an index (PMI) indicating the precoder matrix. The codebook for four transmission antennas includes a precoder matrix, in which weights of antennas #1 to #4 are combined with each other, and an index (PMI) indicating the precoder matrix.

For example, the UE 100-1 calculates an interference level for each precoder matrix included in codebooks corresponding to the number of transmission antennas that are used in the downlink multi-antenna transmission, and selects PMI, which indicates a precoder matrix with the smallest interference level, as BC-PMI. Thus, the more the number of weights (the number of antennas) constituting each precoder matrix, the larger the operation amount of the UE 100-1.

In this regard, in the present embodiment, due to the influence of shadowing and the like, when the number of transmission antennas recognized by the UE 100-1 is smaller than the actual number of transmission antennas, codebooks corresponding to the number of transmission antennas recognized by the UE 100-1 are used. That is, on the basis of the number of transmission antennas (the number of reference signals included in the radio signal) recognized from a radio signal received from the eNB 200-2, the UE 100-1 switches a codebook to be used in the feedback of the BC-PMI. In this way, it is possible to efficiently reduce an operation amount for selecting BC-PMI.

The UE 100-1 may feed back an invalid transmission antenna number recognized from the radio signal received from the eNB 200-2. The UE 100-1 performs an operation for selecting BC-PMI to be fed back from candidates of BC-PMI by employing only a valid transmission antenna number as a target. For example, during the use of the codebook for four transmission antennas, when reference signals corresponding to the antennas #3 and #4 are not received, the UE 100-1 regards the antennas #3 and #4 to be invalid, switches the codebook for four transmission antennas to the codebook for two transmission antennas, and selects BC-PMI. Alternatively, during the use of the codebook for four transmission antennas, when the reference signals corresponding to the antennas #3 and #4 are not received, the UE 100-1 regards the antennas #3 and #4 to be invalid, calculates an interference level for only weights of the antennas #1 and #2 in the codebook for four transmission antennas, and selects BC-PMI.

Figure 15:
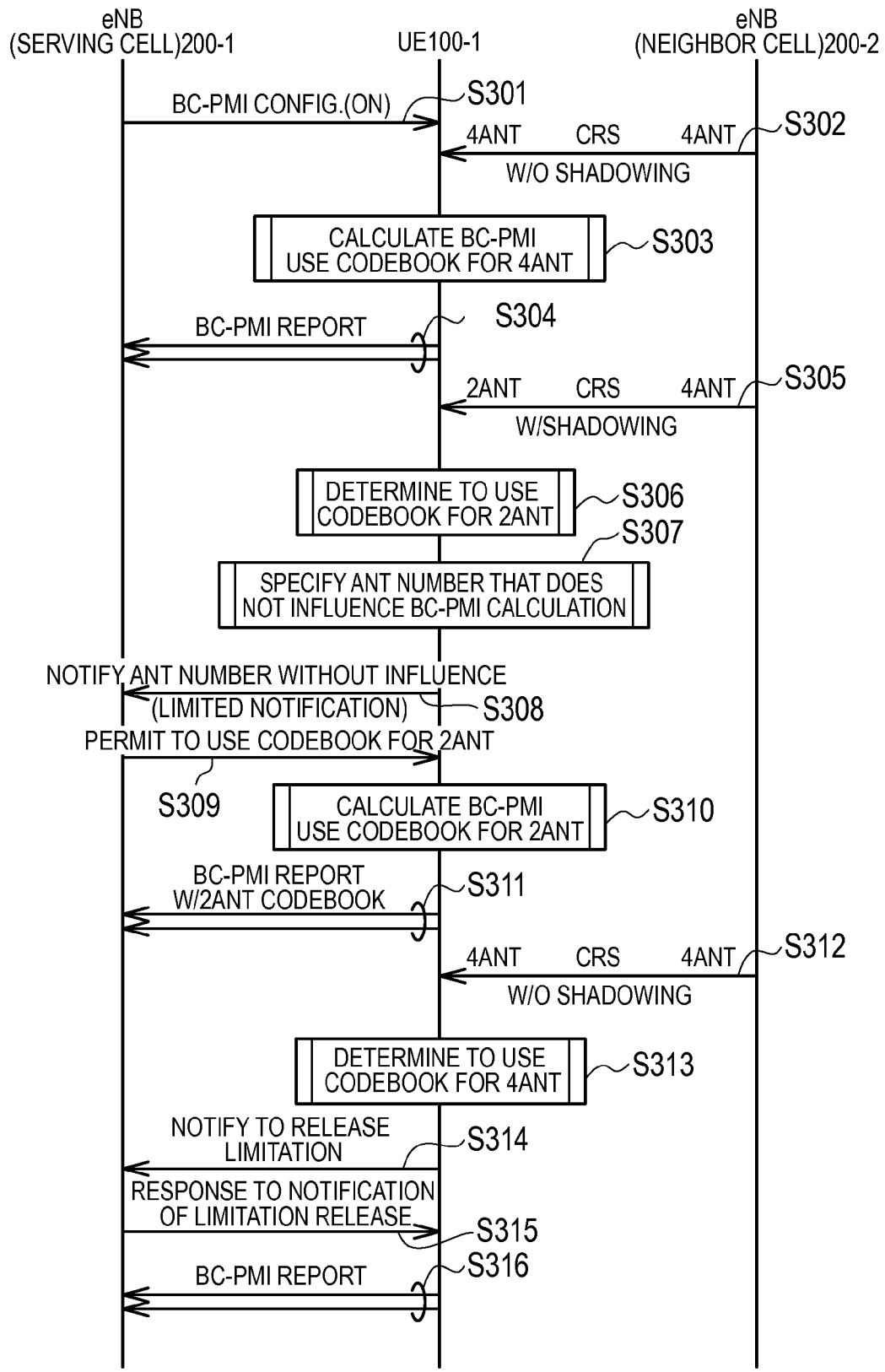
FIG. 15 is a sequence diagram illustrating a specific operation example according to the third embodiment.

FIG. 15 is a sequence diagram illustrating a specific operation example according to the present embodiment. A description for operations the same as those of the first embodiment and the second embodiment will be appropriately omitted.

As illustrated in FIG. 15, in step S301, the eNB 200-1 instructs the UE 100-1 to start (ON) the feedback of the BC-PMI.

In step S302, the eNB 200-2 transmits reference signals from each of four transmission antennas. Since these reference signals are not influenced by shadowing, the UE 100-1 receives the reference signals corresponding to the four transmission antennas.

In step S303, the UE 100-1 receives the reference signals corresponding to the four transmission antennas from the eNB 200-2, and then selects BC-PMI by using the codebook for four transmission antennas.

In step S304, the UE 100-1 feeds back the BC-PMI selected in step S303.

In step S305, the eNB 200-2 transmits reference signals from each of the four transmission antennas. Since these reference signals are influenced by shadowing, the UE 100-1 receives only the reference signals corresponding to two transmission antennas.

In step S306, the UE 100-1 receives only the reference signals corresponding to the two transmission antennas from the eNB 200-2, and then determines that it is possible to switch the codebook for four transmission antennas to the codebook for two transmission antennas.

In step S307, the UE 100-1 designates an invalid transmission antenna number (that is, an antenna number having no influence on BC-PMI calculation).

In step S308, the UE 100-1 notifies (feeds back) the eNB 200-1 of the invalid transmission antenna number.

In step S309, the eNB 200-1 notifies the UE 100-1 of the permission of use of the codebook for two transmission antennas.

In step S310, in response to the permission of the use of the codebook for two transmission antennas, the UE 100-1 switches the codebook for four transmission antennas to the codebook for two transmission antennas, and selects BC-PMI.

In step S311, the UE 100-1 feeds back the BC-PMI selected in step S310.

In step S312, the eNB 200-2 transmits reference signals from each of the four transmission antennas. Since these reference signals are not influenced by shadowing, the UE 100-1 receives the reference signals corresponding to the four transmission antennas.

In step S313, the UE 100-1 receives the reference signals corresponding to the four transmission antennas from the eNB 200-2, and then determines that it is possible to switch the codebook for two transmission antennas to the codebook for four transmission antennas.

In step S314, the UE 100-1 notifies (feeds back) the eNB 200-1 of limitation release of the codebook.

In step S315, the eNB 200-1 transmits, to the UE 100-1, a response for the notification from the UE 100-1.

In step S316, the UE 100-1 selects BC-PMI by using the codebook for four transmission antennas, and feeds back the selected BC-PMI.

[Fourth Embodiment]

Hereinafter, a fourth embodiment will be described while focusing on differences from the aforementioned first embodiment to third embodiment.

In the present embodiment, the eNB 200-1 and the eNB 200-2 switch a CoMP scheme from the CB-CoMP to CS (Coordinated Scheduling)-CoMP in response to stop (OFF) the feedback of the BC-PMI. In the CS-CoMP, a plurality of eNBs do not perform beamforming/null steering in coordination with one another, and perform scheduling in coordination with one another. That is, the CS-CoMP is a CoMP scheme requiring no feedback of the BC-PMI.

Figure 16:
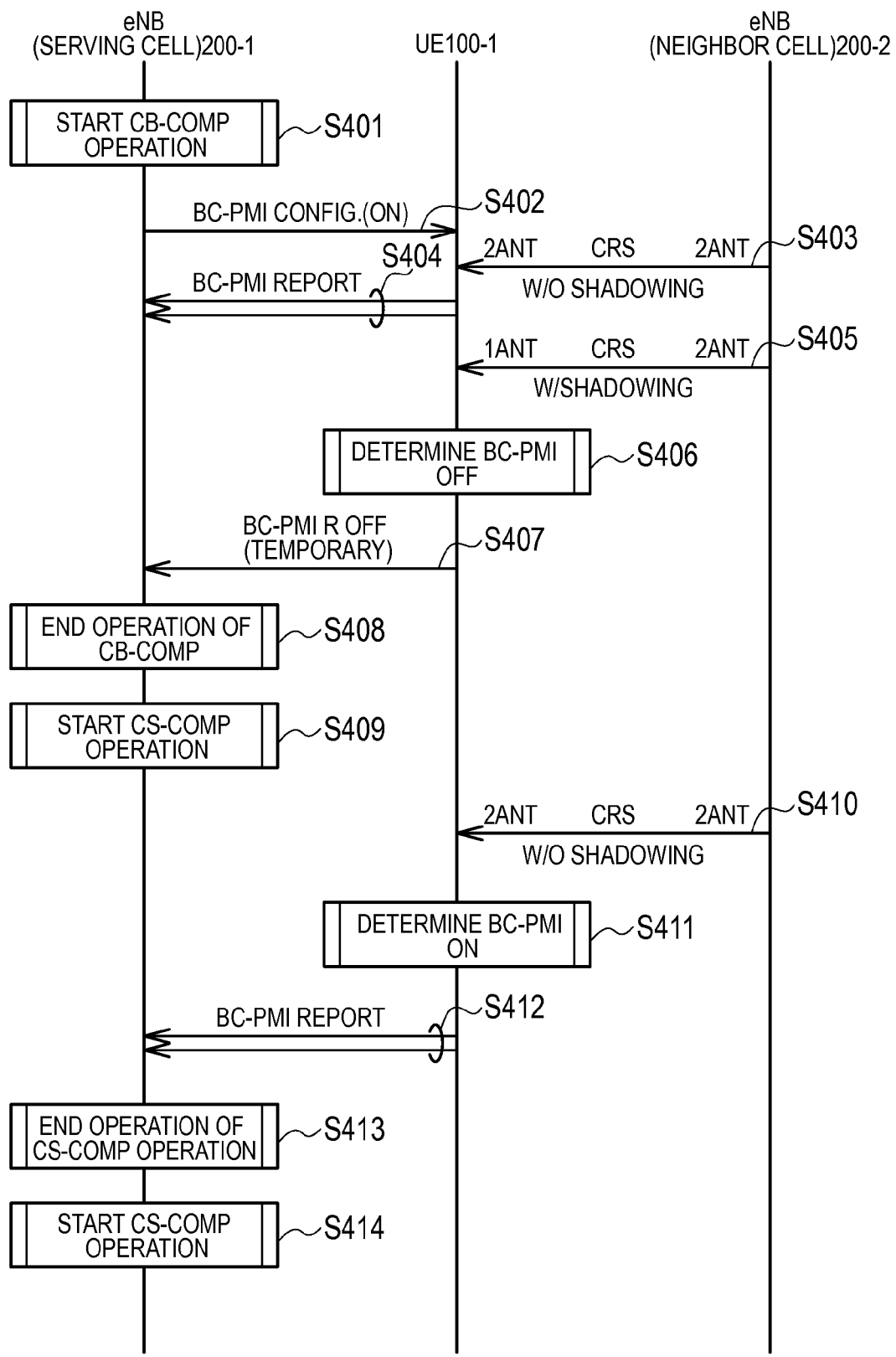
FIG. 16 is a sequence diagram illustrating a specific operation example according to the fourth embodiment.

FIG. 16 is a sequence diagram illustrating a specific operation example according to the present embodiment. Hereinafter, feedback ON/OFF determination based on the number of transmission antennas will be mainly described. Furthermore, a description for operations the same as those of the first embodiment to the third embodiment will be appropriately omitted.

As illustrated in FIG. 16, in step S401, the eNB 200-1 (and the eNB 200-2) starts the operation of the CB-CoMP.

In step S402, the eNB 200-1 instructs the UE 100-1 to start (ON) the feedback of the BC-PMI.

In step S403, the eNB 200-2 transmits reference signals from each of two transmission antennas. Since these reference signals are not influenced by shadowing, the UE 100-1 receives the reference signals corresponding to the two transmission antennas.

In step S404, the UE 100-1 starts (ON) the feedback of the BC-PMI in response to the instruction from the eNB 200-1.

In step S405, the eNB 200-2 transmits reference signals from each of the two transmission antennas. Since these reference signals are influenced by shadowing, the UE 100-1 receives only the reference signal corresponding to one transmission antenna.

In step S406, on the basis of the reference signals received from the eNB 200-2, the UE 100-1 determines whether to stop (OFF) the feedback of the BC-PMI. Even though the eNB 200-2 transmits reference signals from each of the two transmission antennas, since the UE 100-1 receives only the reference signal corresponding to the one transmission antenna, the UE 100-1 determines to stop (OFF) the feedback of the BC-PMI.

In step S407, the UE 100-1 transmits a feedback stop notification of the BC-PMI to the eNB 200-1.

In step S408, the eNB 200-1 (and the eNB 200-2) ends the operation of the CB-CoMP.

In step S409, the eNB 200-1 (and the eNB 200-2) starts the operation of the CS-CoMP.

In step S410, the eNB 200-2 transmits reference signals from each of the two transmission antennas. Since these reference signals are not influenced by shadowing, the UE 100-1 receives the reference signals corresponding to the two transmission antennas.

In step S411, on the basis of the reference signals received from the eNB 200-2, the UE 100-1 determines whether to resume (ON) the feedback of the BC-PMI. Since the eNB 200-2 transmits reference signals from each of the two transmission antennas and the UE 100-1 receives the reference signals corresponding to the two transmission antennas, the UE 100-1 determines to resume (ON) the feedback of the BC-PMI.

In step S412, the UE 100-1 resumes (ON) the feedback of the BC-PMI.

In step S413, the eNB 200-1 (and the eNB 200-2) ends the operation of the CS-CoMP.

In step S414, the eNB 200-1 (and the eNB 200-2) starts (resumes) the operation of the CB-CoMP.

[Other Embodiments]

Thus, the present invention has been described with the embodiments. However, it should not be understood that those descriptions and drawings constituting a part of this disclosure limit the present invention. From this disclosure, a variety of alternate embodiments, examples, and applicable techniques will become apparent to one skilled in the art.

In the aforementioned each embodiment, the UE 100-1 feeds back a plurality of BC-PMIs. However, the present invention is not limited to the case in which the plurality of BC-PMIs are fed back. For example, only one BC-PMI may be fed back.

The aforementioned each embodiment has described the case in which the BC-PMI is used in the CB-CoMP. However, instead of BC-PMI, WC (Worst Companion)-PMI may also be used. The WC-PMI is information (an index) indicating a precoder matrix (a precoder matrix in which a beam is directed toward the UE 100-1) indicating that the influence of interference from the eNB 200-2 to the UE 100-1 is large. In other words, the WC-PMI is information (an index) indicating a precoder matrix that is not preferable to the UE 100-1. In this case, the eNB 200-2 assigns a radio resource, which is equal to that assigned to the UE 100-1, to the UE 100-2 in the cell of the eNB 200-2, which feeds back PMI that does not coincide with WC-PMI from the UE 100-1, and applies the non-coinciding PMI to transmission to the UE 100-2.

The aforementioned each embodiment has described the case in which the present invention is applied to the CB-CoMP. However, the present invention is not limited to CB-CoMP, and can also be applied to MU (Multi User)-MIMO (Multiple Input Multiple Output). In the MU-MIMO, a plurality of UEs 100 are spatially multiplexed by the downlink multi-antenna transmission.

Figure 17:
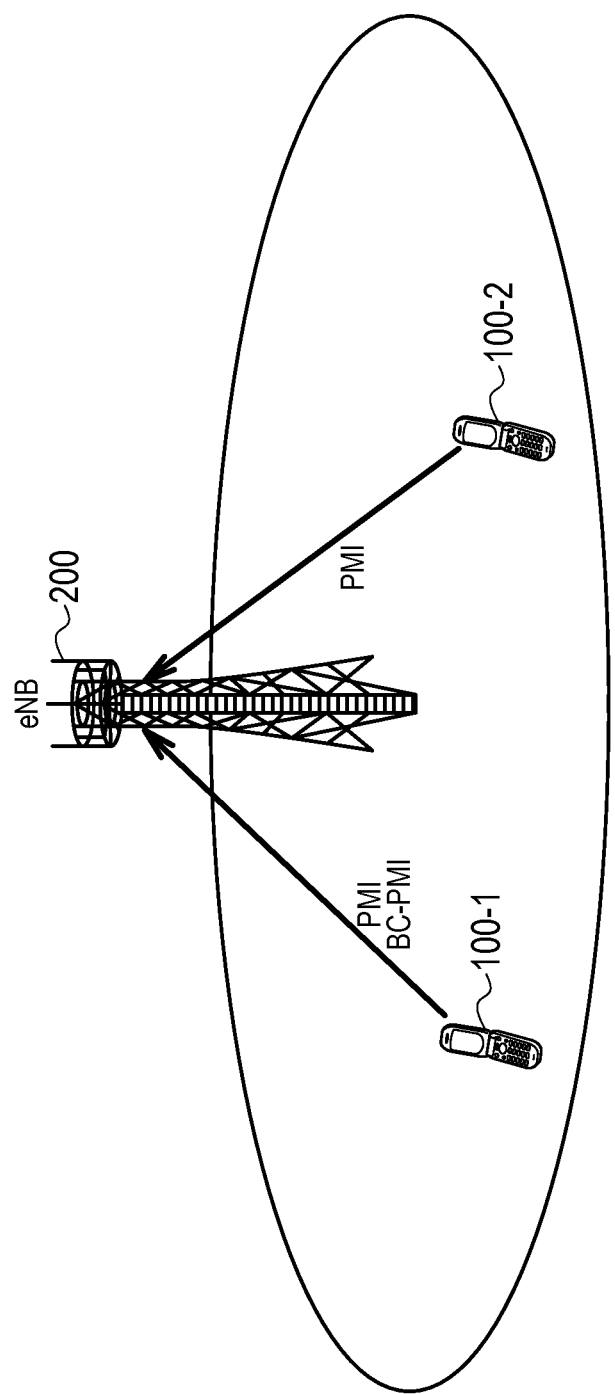
FIG. 17 is a diagram illustrating an operation environment according to another embodiment.
Figure 18:
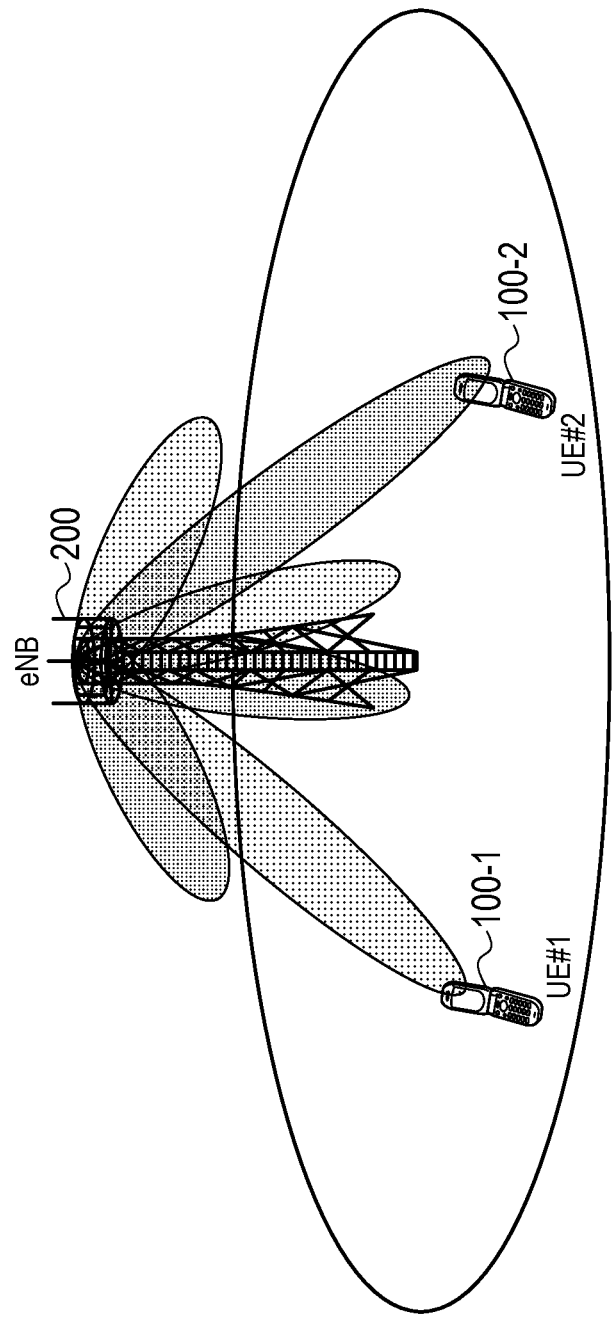
FIG. 18 is a diagram illustrating an operation environment according to another embodiment.

FIG. 17 and FIG. 18 are diagrams illustrating operation environments according to another embodiment.

As illustrated in FIG. 17, the UE 100-1 and the UE 100-2 establish a connection with the cell of the eNB 200. That is, the UE 100-1 and the UE 100-2 perform communication with assuming the cell of the eNB 200 as the serving cell. In order to improve the utilization efficiency of a frequency, the eNB 200 performs MU-MIMO. Specifically, the eNB 200 performs transmission to the UE 100-1 and the UE 100-2 by using the same radio resource.

The UE 100-1 feeds back BC-PMI to the eNB 200 in addition to normal feedback (PMI, RI, and CQI) for the eNB 200. The eNB 200 assigns a radio resource, which is equal to that assigned to the UE 100-1, to the UE 100-2 that feeds back PMI that coincides with the BC-PMI fed back from the UE 100-1. Then, the eNB 200 performs transmission to the UE 100-2 according to the coinciding PMI.

As a consequence, as illustrated in FIG. 18, the eNB 200 is able to perform transmission to the UE 100-2 by directing a beam to the UE 100-2 while directing a null to the UE 100-1. Furthermore, the eNB 200 performs transmission to the UE 100-1 according to the normal PMI fed back from the UE 100-1. As a result, the eNB 200 is able to direct a beam to the UE 100-1.

Even in the operation environments of the MU-MIMO, the UE 100-1 is able to stop the feedback of the BC-PMI according to the situation, similarly to the aforementioned each embodiment.

The aforementioned each embodiment has described the case in which the present invention is applied to the CB-CoMP. However, the present invention can be applied not only to the CB-CoMP but also to D2D communication that is direct device-to-device communication. A case where the UE 100-2 and the UE 100-2 perform D2D communication by using a downlink band in cellular communication that is communication via a core network, and a case where the UE 100-2 and the UE 100-2 perform D2D communication by using an uplink band in cellular communication will be described, below.

(a) D2D communication (downlink band)

FIG. 19 and FIG. 20 are diagrams illustrating operation environments (part 1) according to another embodiment.

As illustrated in FIG. 19, the UE 100-1, the UE 100-2, and the UE 100-3 establish a connection with the cell of the eNB 200. The UE 100-2 and UE 100-3 perform D2D communication by using a downlink band in cellular communication. The eNB 200 has a capability of controlling the D2D communication. Therefore, the eNB 200 schedules a radio resource used for the D2D communication and transmits information on PMI described later, for example, to control the D2D communication.

As illustrated in FIG. 19, the UE 100-1 feeds back BC-PMI to the eNB 200. Here, the BC-PMI, which is different from the BC-PMI relating to the above-described embodiment, is information (an index) indicating a precoder matrix in which a null is directed toward the UE 100-1 that is not a partner terminal of the D2D communication at the time of transmission from the UE 100-3 that performs the D2D communication, to the UE 100-2. On the basis of a signal (for example, a reference signal) received from the UE 100-3, the UE 100-1 feeds back the BC-PMI such that a reception level (that is, an interference level) from the UE 100-3 is reduced.

On the other hand, the UE 100-2 feeds back the PMI to the eNB 200. Here, the PMI, which is different from the PMI relating to the above-described embodiment, is information (an index) indicating a precoder matrix in which a beam is directed toward the UE 100-2 at the time of transmission from the UE 100-3 that is a partner terminal of the D2D communication, to the UE 100-2. On the basis of a signal (for example, a reference signal) received from the UE 100-3, the UE 100-2 feeds back the PMI such that a reception level from the UE 100-3 is improved.

The eNB 200 checks the BC-PMI fed back from the UE 100-1 with the PMI fed back from the UE 100-2. When the BC-PMI coincides with the PMI, the eNB 200 requests the UE 100-3 to perform transmission to the UE 100-2 according to the PMI. Specifically, the eNB 200 transmits the information indicating the PMI used for performing transmission from the UE 100-3 to the UE 100-2, to the UE 100-3. Then, the UE 100-3 performs transmission to the UE 100-2 according to the PMI received from the eNB 200.

As a result, as illustrated in FIG. 20, the UE 100-3 can perform transmission to the UE 100-2 by directing a beam to the UE 100-2 while directing a null to the UE 100-1.

Even in such operation environments, the UE 100-1 is able to stop the feedback of the BC-PMI according to the situation, similarly to the aforementioned each embodiment.

It is noted that in the above case, a case where the UE 100-2 and the UE 100-3 perform D2D communication is described; however, a case where before the UE 100-2 and the UE 100-3 start performing the D2D communication may be applied. Therefore, when the BC-PMI fed back from the UE 100-1 coincides with the PMI fed back from the UE 100-2 on the basis of the reference signal from the UE 100-3, for example, the eNB 200 transmits the information indicating the PMI to the UE 100-3. That is, the eNB 200 transmits, to the UE 100-3 capable of performing D2D communication (that is, the UE 100-3 having a D2D communication capability), information indicating PMI used in the D2D communication. The UE 100-3 starts the D2D communication according to the PMI. As a result, the UE 100-3 can perform transmission to the UE 100-2 by directing a beam to the UE 100-2 while directing a null to the UE 100-1.

(b) D2D Communication (Uplink Band)

The description similar to the above-described D2D communication (downlink band) will be appropriately omitted. FIG. 21 and FIG. 22 are diagrams illustrating operation environments (part 2) according to another embodiment.

As illustrated in FIG. 21, the UE 100-2 and the UE 100-3 perform the D2D communication by using an uplink band in cellular communication.

As illustrated in FIG. 21, each of the UE 100-2 and the UE 100-3 feeds back the PMI and the BC-PMI to the eNB 200. Here, the PMI fed back from the UE 100-2 is information indicating a precoder matrix in which a beam is directed toward the UE 100-2 at the time of transmission from the UE 100-3 to the UE 100-2. Further, the BC-PMI fed back from the UE 100-2 is information indicating a precoder matrix in which a null is directed toward the UE 100-2 at the time of transmission from the UE 100-1 that performs the cellular communication, to the eNB 200. On the basis of a signal (for example, a reference signal) received from the UE 100-1, the UE 100-2 feeds back the BC-PMI such that a reception level (that is, an interference level) from the UE 100-1 is reduced.

Likewise, the PMI fed back from the UE 100-3 is information indicating a precoder matrix in which a beam is directed toward the UE 100-3 at the time of transmission from the UE 100-2 to the UE 100-3. Further, the BC-PMI fed back from the UE 100-3 is information indicating a precoder matrix in which a null is directed toward the UE 100-3 at the time of transmission from the UE 100-1 to the eNB 200.

Further, on the basis of the signal received from the UE 100-2, the eNB 200 calculates the BC-PMI indicating a precoder matrix in which a null is directed toward the eNB 200 at the time of transmission from the UE 100-2 to the UE 100-3. Likewise, on the basis of the signal received from the UE 100-3, the eNB 200 calculates the BC-PMI indicating a precoder matrix in which a null is directed toward the eNB 200 at the time of transmission from the UE 100-3 to the UE 100-2. Further, on the basis of the signal received from the UE 100-1, the eNB 200 calculates the PMI indicating a precoder matrix in which a beam is directed toward the eNB 200 at the time of transmission from the UE 100-1 to the eNB 200.

Next, the eNB 200 performs determination as to interference avoidance on the basis of the PMIs and the BC-PMIs respectively fed back from the UE 100-2 and the UE 100-3 and the PMI and the BC-PMI calculated by the eNB 200.

Firstly, the eNB 200 checks the BC-PMIs from the UE 100-2 and the UE 100-3, respectively, with the PMI calculated by the eNB 200. When, as a result of the checking, the BC-PMI from at least one of the UE 100-2 and the UE 100-3 coincides with the PMI calculated by the eNB 200, the eNB 200 determines that it is possible to avoid the interference to the D2D communication to at least one of the UE 100-2 and the UE 100-3 from the UE 100-1.

Secondly, the eNB 200 checks the PMIs from the UE 100-2 and the UE 100-3, respectively, with the BC-PMI calculated by the eNB 200. When, as a result of the checking, the PMI from at least one of the UE 100-2 and the UE 100-3 coincides with the BC-PMI calculated by the eNB 200, the eNB 200 determines that it is possible to avoid the interference to the cellular communication from at least one of the UE 100-2 and the UE 100-3.

The eNB 200 schedules a radio resource on the basis of the above-described result of the checking.

(a) When the eNB 200 determines that it is possible to avoid the interference to the above-described cellular communication and D2D communication (that is, when the BC-PMI from the UE 100-2 (or the UE 100-3) coincides with the PMI calculated by the eNB 200 and the PMI from the UE 100-2 (or the UE 100-3) coincides with the BC-PMI calculated by the eNB 200), the eNB 200 can assign the shared radio resource to the UE 100-1, the UE 100-2, and the UE 100-3.

(b) When the eNB 200 determines that it is possible to avoid the interference to the above-described D2D communication (that is, when the BC-PMI from the UE 100-2 (or the UE 100-3) coincides with the PMI calculated by the eNB 200) and when the scheduling is performed according to a D2D priority rule to prioritize the D2D communication interference avoidance, the eNB 200 can assign the shared radio resource to the UE 100-1, the UE 100-2, and the UE 100-3. On the other hand, when the scheduling is not performed according to the D2D priority rule, the eNB 200 can assign a different radio resource to the UE 100-1, the UE 100-2, and the UE 100-3.

(c) When the eNB 200 determines that it is possible to avoid the interference to the above-described cellular communication (that is, when the PMI from the UE 100-2 (or the UE 100-3) coincides with the BC-PMI calculated by the eNB 200) and when the scheduling is performed according to a cellular priority rule to prioritize the cellular communication interference avoidance, the eNB 200 can assign the shared radio resource to the UE 100-1, the UE 100-2, and the UE 100-3. On the other hand, when the scheduling is not performed according to the cellular priority rule, the eNB 200 can assign a different radio resource to the UE 100-1, the UE 100-2, and the UE 100-3.

(d) When the eNB 200 determines that it is not possible to avoid the interference to the above-described cellular communication and D2D communication (that is, when the BC-PMI from the UE 100-2 (or the UE 100-3) does not coincide with the PMI calculated by the eNB 200 and the PMI from the UE 100-2 (or the UE 100-3) does not coincide with the BC-PMI calculated by the eNB 200), the eNB 200 can assign a different radio resource to the UE 100-1, the UE 100-2, and the UE 100-3. It is noted that the eNB 200 can assign the shared radio resource to the UE 100-1, the UE 100-2, and the UE 100-3 also according to a predetermined policy.

In the present embodiment, a description may proceed on the assumption that in the eNB 200, the BC-PMI from the UE 100-2 coincides with the PMI calculated by the eNB 200 and the PMI from the UE 100-2 coincides with the BC-PMI calculated by the eNB 200.

Next, the eNB 200 transmits the information indicating the radio resource assigned to each UE 100 (each of the UE 100-1, the UE 100-2, and the UE 100-3) and the information indicating the PMI, to each UE 100. The information indicating the PMI transmitted to the UE 100-1 is information indicating a precoder matrix in which the beam from the UE 100-1 is directed toward the eNB 200 and the null from the UE 100-1 is directed toward the UE 100-2. Further, the information indicating the PMI transmitted to each of the UE 100-2 and the UE 100-3 is information indicating a precoder matrix in which the beam from the UE 100-3 is directed toward the UE 100-2 and the null from the UE 100-3 is directed toward the eNB 200.

On the basis of the information indicating the radio resource received from the eNB 200 and the information indicating the PMI, each UE 100, that is, the UE 100-1 transmits the data to the eNB 200, the UE 100-2 transmits the data to the UE 100-3, and the UE 100-3 receives the data from the UE 100-3. As a result, as illustrated in FIG. 22, the UE 100-1 can perform transmission to the eNB 200 by directing a beam to the eNB 200 while directing a null to the UE 100-2. Further, the UE 100-3 can perform transmission to the UE 100-2 by directing a null to the eNB 200 while directing a beam to the UE 100-2.

Even in such operation environments, each of the UE 100-2 and the UE 100-3 is able to stop the feedback of the BC-PMI according to the situation, similarly to the aforementioned each embodiment.

It is noted that similarly to a case where the D2D communication is performed in the above-described downlink band, the above-described operation may be performed before the UE 100-2 and the UE 100-3 start the D2D communication.

Further, in the above-described embodiment, the UE 100-1 directly feeds back to the eNB 200; however, the present invention is not limited thereto. For example, when the UE 100-1 performs the D2D communication in a D2D group including an anchor UE that performs communication with the eNB 200 as a representative of a plurality of UEs 100 that perform. the D2D communication, the UE 100-1 may transmit the BC-PMI to the anchor UE instead of directly transmitting the BC-PMI to the eNB 200. That is, the UE 100-1 may transmit the BC-PMI to the eNB 200 by way of the anchor UE. In this case, the UE 100-1 may start the feedback of the BC-PMI in response to the instruction from the anchor UE. Likewise, the UE 100-2 may transmit the PMI to the eNB 200 by way of the anchor UE, and the UE 100-3 may receive the PMI from the eNB 200 by way of the anchor UE.

Further, in the above-described D2D communication case, the eNB 200 controls the beam steering and the null steering on the basis of the precoder matrix; however the present invention is not limited thereto. For example, the eNB 200 transmits the BC-PMI fed back from the UE 100-1 that performs the cellular communication, to the anchor UE. When the PMI fed back to the anchor UE from the UE 100-3 in a D2D group including the anchor UE is checked with the BC-PMI received from the eNB 200, the control of the beam steering and the null steering may be performed. Therefore, the anchor UE may control the beam steering and the null steering on the UE 100 that performs the D2D communication, and the eNB 200 may control the beam steering and the null steering on the UE 100 that performs the cellular communication.

In addition, the aforementioned embodiments have described an example in which the present invention is applied to the LTE system. However, the present invention may also be applied to systems, other than the LTE system, as well as the LTE system.

In addition, the entire content of U.S. Provisional Application No. 61/723,052 (filed on Nov. 6, 2012) is incorporated in the present specification by reference.

INDUSTRIAL APPLICABILITY

As described above, the mobile communication system, the user terminal and the processor according to the present invention are possible to realize efficient feedback, and thus are useful for a mobile communication field.

The invention claimed is:

1. A user terminal comprising:
a controller configured to start feedback of predetermined precoder matrix information to a base station that manages a cell connecting with the user terminal, in response to an instruction from the base station, wherein
the predetermined precoder matrix information is used to decide a precoder matrix that is applied to a transmission to another user terminal in a neighboring base station adjacent to the base station, and
the controller further configured to, after the feedback is started in response to the instruction, stop the feedback in response to determining that only a radio signal corresponding to one transmission antenna is received from the neighboring base station.

2. A user terminal comprising:
a controller configured to start feedback of predetermined precoder matrix information to a base station that manages a cell connecting with the user terminal, in response to an instruction from the base station, wherein
the predetermined precoder matrix information is used to decide a precoder matrix that is applied to a transmission to another user terminal in a neighboring base station adjacent to the base station, and
the controller further configured to, after the feedback is started in response to the instruction, stop the feedback in response to determining that a time division duplex scheme is applied to the neighboring base station.

3. A user terminal comprising:
a controller configured to start feedback of predetermined precoder matrix information to a base station that manages a cell connecting with the user terminal, in response to an instruction from the base station, wherein
the predetermined precoder matrix information is used to decide a precoder matrix that is applied to a transmission to another user terminal in a neighboring base station adjacent to the base station,
the predetermined precoder matrix information is received in the base station to be transferred from the base station to the neighboring base station via an inter-base station interface, and
the controller further configured to, after the feedback is started in response to the instruction, stop the feedback in response to determining that the neighboring base station does not support the inter-base station interface.

4. A user terminal comprising:
a controller configured to start feedback of predetermined precoder matrix information to a base station that manages a cell connecting with the user terminal, in response to an instruction from the base station, wherein
the predetermined precoder matrix information is used to decide a precoder matrix that is applied to a transmission to another user terminal, and
the controller further configured to, after the feedback is started in response to the instruction, stop the feedback in response to determining that a neighboring base station adjacent to the base station does not support coordinated transmission for performing multi-antenna transmission in downlink in coordination with the base station.

5. A user terminal comprising:
a controller configured to start feedback of predetermined precoder matrix information to a base station that manages a cell connecting with the user terminal, in response to an instruction from the base station, wherein
the predetermined precoder matrix information is used to decide a precoder matrix that is applied to a transmission to another user terminal in a neighboring base station adjacent to the base station,
the controller further configured to, after the feedback is started in response to the instruction, feed back an invalid transmission antenna number that is recognized from a radio signal received from the neighboring base station, and
the controller configured to perform an operation for selecting the predetermined precoder matrix information to be fed back from candidates of the predetermined precoder matrix information by employing only a valid transmission antenna number as a target.

* * * * *